United States Patent [19]

Tomisawa

[11] Patent Number: 4,727,530

[45] Date of Patent: Feb. 23, 1988

[54] DISC ROTATION CONTROL DEVICE FOR A DISC PLAYER

[75] Inventor: Norio Tomisawa, Hamamatsu, Japan

[73] Assignee: Nippon Gakki Seizo Kabushiki Kaisha, Hamamatsu, Japan

[21] Appl. No.: 658,154

[22] Filed: Oct. 5, 1984

[30] Foreign Application Priority Data

Oct. 14, 1983 [JP] Japan .................................. 58-191995
Oct. 14, 1983 [JP] Japan ........................... 58-157936[U]
Dec. 9, 1983 [JP] Japan .................................. 58-233230
Dec. 9, 1983 [JP] Japan .................................. 58-233231

[51] Int. Cl.⁴ ............................................. G11B 19/24
[52] U.S. Cl. ........................................ 369/50; 369/59; 369/111; 358/338
[58] Field of Search ....................... 369/47, 50, 61, 62, 369/48, 111, 59; 358/321, 322, 338, 342; 360/73

[56] References Cited

U.S. PATENT DOCUMENTS 4,353,089 10/1982 Winslow et al. .................... 358/337
4,376,956 3/1983 Kelleher ............................. 358/338
4,575,835 3/1986 Nishikawa et al. .................. 369/50

*Primary Examiner*—Donald McElheny, Jr.
*Attorney, Agent, or Firm*—Spensley Horn Jubas & Lubitz

[57] ABSTRACT

A disc rotation control device for a compact disc player comprises a stable rotation detection circuit for detecting whether rotation of a compact disc is in a stable state or in an unstable state, a phase control loop for phase-controlling the disc rotation and direct control means for directly controlling the disc rotation. The disc rotation is controlled by the phase control loop when the disc rotation is in a stable state and, if the disc rotation has become unstable, the control of the disc rotation is switched to one by the direct control means. During the phase control, even if an EFM signal reproduced from a disc has become unavailable for some reason, preceding phase difference data is held and used for the disc rotation control.

10 Claims, 22 Drawing Figures

FIG. 9

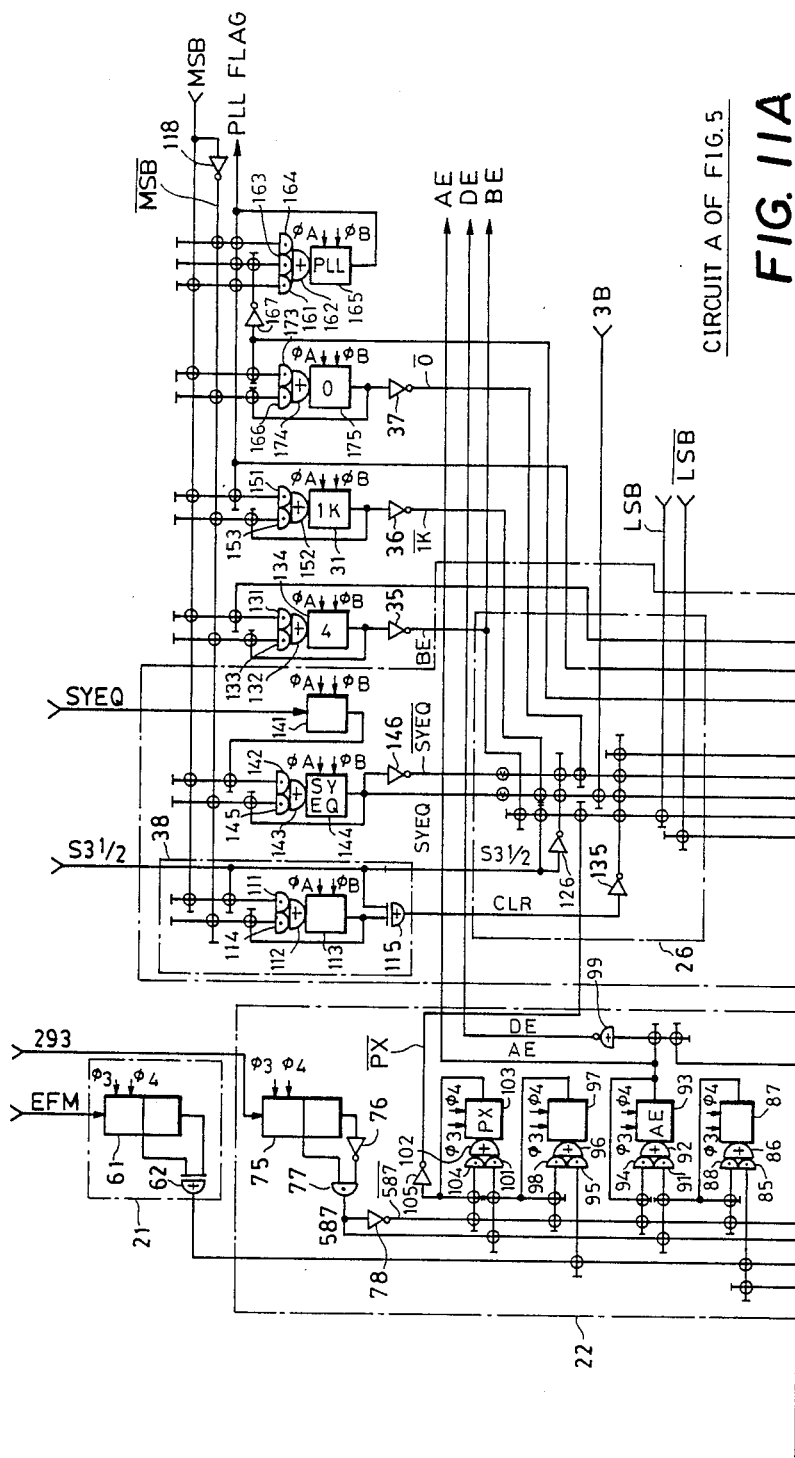
FIG. 11A  CIRCUIT A OF FIG.5

CIRCUIT A OF FIG. 5

CIRCUIT B OF FIG.5

CIRCUIT B OF FIG.5

CIRCUIT B OF FIG. 5

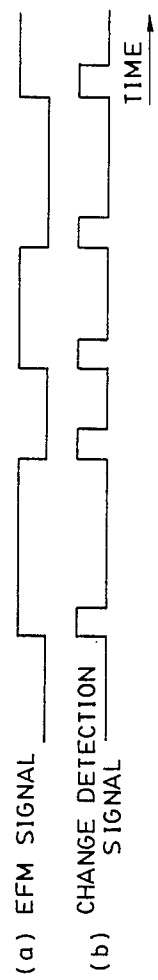

DISC ROTATION CONTROL DEVICE FOR A DISC PLAYER

BACKGROUND OF THE INVENTION

This invention relates to a rotation control device for a disc player, more particularly a compact disc player for the compact disc system.

In the compact disc which is digitally recorded with audio information, information is recorded at a constant linear velocity and, for securing this constant linear velocity in reproducing this information, a control of disc rotation is performed through a phase control operation on the basis of phase difference data obtained by comparing a frame synchronizing signal produced from a reproduced EFM signal with an internal synchronizing signal produced by an internal clock generator.

In a case where an actual rotation speed of the disc is largely deviated from a normal linear velocity, it is extremely difficult to promptly restore the rotation speed to a stable one only by this phase control operation. Also in a case where a reproduced EFM signal has become unavailable for such a reason that the light beam has become out of focus during reproduction of the recorded information, the phase difference data becomes unavailable with a result that the disc rotation can no longer be controlled at a constant linear velocity.

SUMMARY OF THE INVENTION

It is, therefore, an object of the present invention to provide a rotation control device for a disc player capable of promptly restoring the rotation speed to a stable one even in case the rotation speed has become largely deviated from a normal linear velocity.

It is another object of the invention to provide a control device for a disc player capable of maintaining rotation of the disc at the normal linear velocity even in case the reproduced EFM signal has become unavailable.

It is another object of the invention to provide a rotation control device for a disc player capable of detecting whether the disc is rotating at the normal linear velocity or not by detecting a signal pattern of the EFM signal.

It is still another object of the invention to provide a rotation control device for a disc player capable of efficiently obtaining a PWM signal for driving a disc motor in case a DC motor is used for the disc motor.

For achieving the first object of the invention, in case the disc rotation has been deviated from the normal velocity and has therefore become unstable, the disc motor is directly controlled in the direction in which the disc rotation approaches a stable rotation by means of a predetermined drive signal instead of by the phase control operation and, upon restoring of the rotation speed to a stable one, the control of the disc rotation is switched to the phase control operation.

For achieving the second object of the invention, preceding phase difference data is held so that it is used for the disc rotation control in case the reproduced signal has become unavailable whereby the disc can be continuously rotated at the normal linear velocity.

For achieving the third object of the invention, change in the rising and falling of the reproduced signal is detected and a detection signal is applied to cascaded registers with gates being inserted therebetween, the detection signal is shifted through registers at a predetermined rate, the signal being shifted is cleared each time the change detection signal is generated, and an output of a last stage of the registers and the change detection signal are ANDed to detect the signal pattern. Whether or not the disc is rotating at the normal velocity can be detected by detecting whether or not a specific pattern of a frame synchronizing signal is observed in the reproduced signal.

For achieving the fourth object of the invention, a counter which is circulating at a predetermined rate is prepared, its count and speed command data are compared with each other, and a PWM signal is produced with a pulse width from a time point at which this count has reached the speed command data till a time point at which the count has reached a predetermined count or a pulse width from a time point at which this count has reached the speed command data.

BRIEF DESCRIPTION OF THE DRAWINGS

In the accompanying drawings,

FIG. 9 is a diagram showing an example of changing between control modes by a control logic 48;

FIGS. 11A and 11B is a circuit diagram showing an example of the circuit designated by reference character A in FIG. 5;

FIG. 14 is a diagram showing relationship between an EFM signal and a change detection signal.

DESCRIPTION OF PREFERRED EMBODIMENTS

An embodiment of the invention will now be described.

Figure 1:
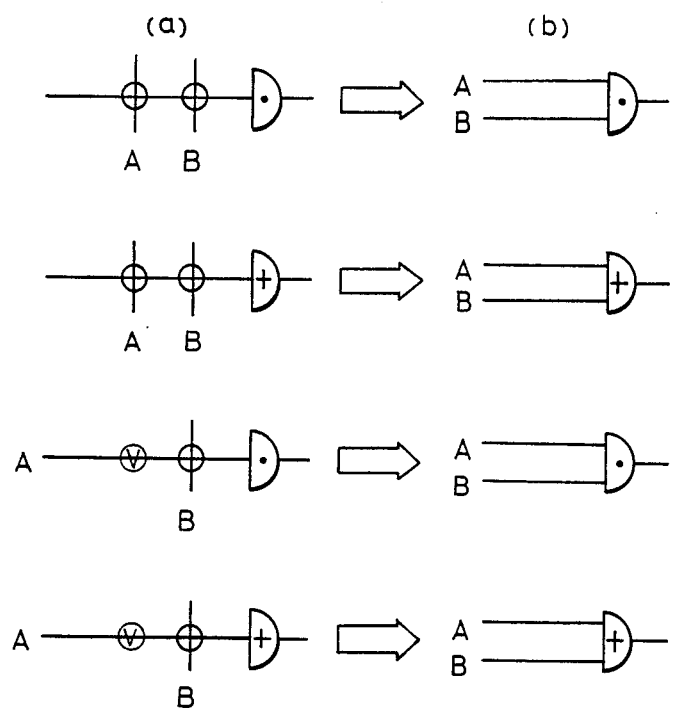
FIG. 1 consisting of (a) and (b) is a diagram for explaining manners of illustrating the logical circuit in this specification.

In the drawings, logic circuits are illustrated in somewhat simplified manner for facilitating understanding. The left row (a) of FIG. 1 shows examples of such simplified illustration which correspond to the normal illustration shown in the right row (b) of FIG. 1.

Figure 2:
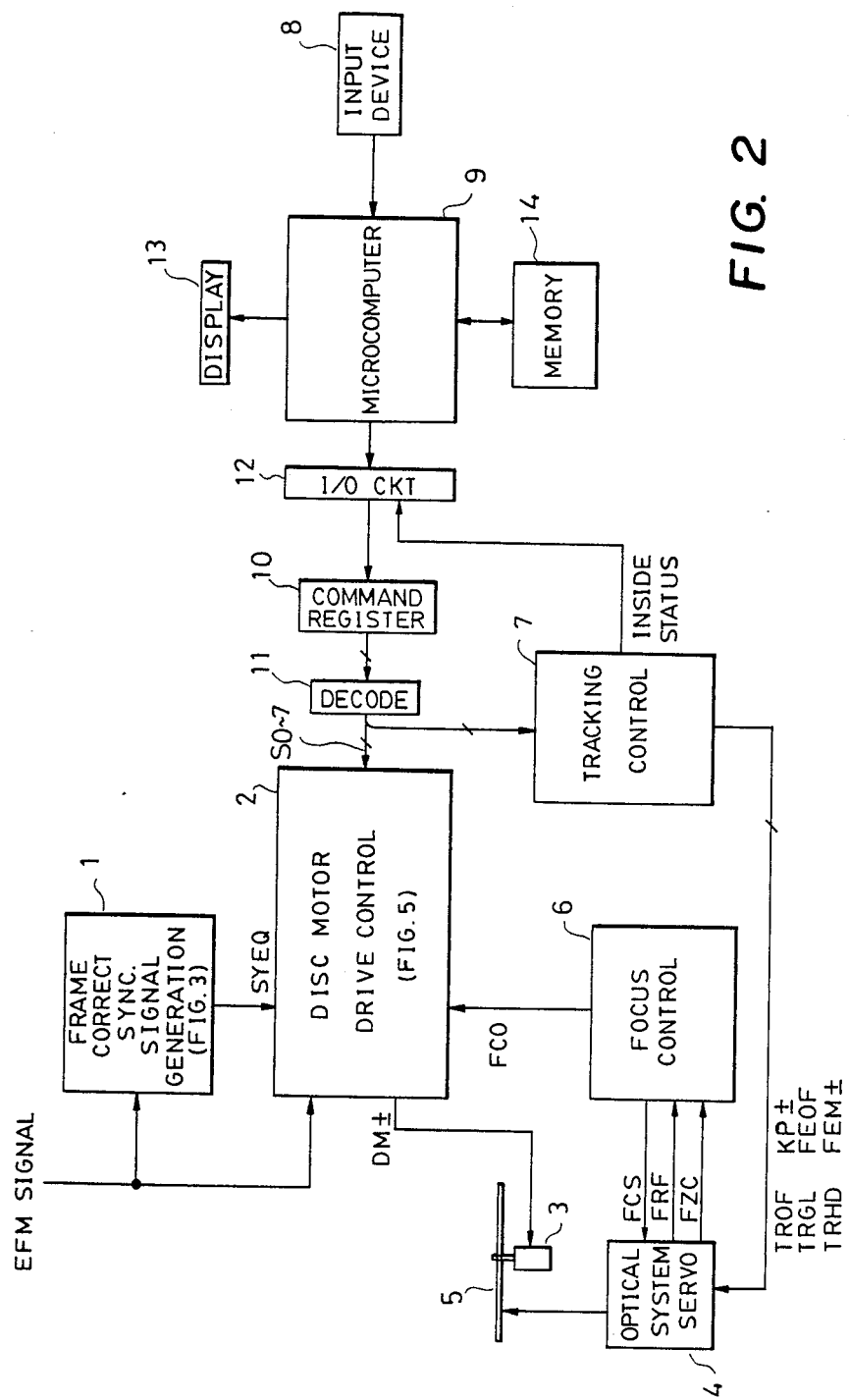
FIG. 2 is a block diagram showing a control system of a disc reproduction device to which the present invention is applied.

FIG. 2 shows an example of an entire construction of the disc control system in a compact disc player, to which the invention is applied. This disc control system comprises a disc rotation servo system, a focus servo system concerning focusing control of the light beam and a tracking servo system concerning tracking control of the light beam.

Figure 3:
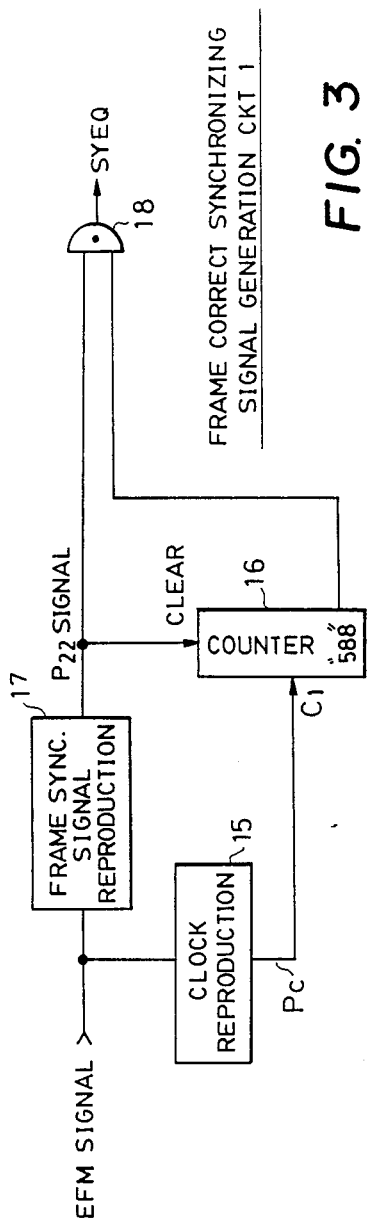
FIG. 3 is a block diagram showing an example of a circuitry for producing a frame correct synchronizing signal SYEQ.
Figure 4:
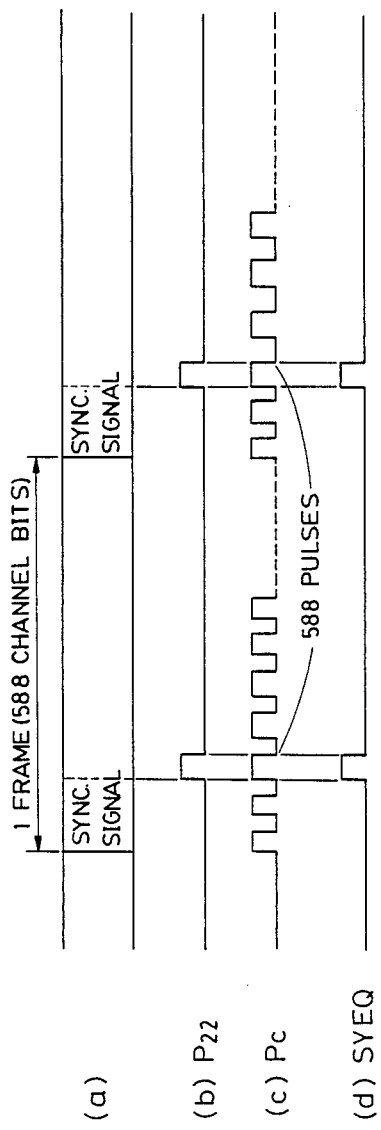
FIGS. 4(a)-((d) is a graph for explaining the operation of the circuit shown in FIG. 3.

Referring now to FIG. 2, a frame correct synchronizing signal generation circuit 1 receives an EFM (eight-to-fourteen modulation) signal obtained by playing back a disc 5 and detects whether the rotation of disc motor 3 is in a stable state (i.e., a state in which the disc motor 3 is rotating stably at a rotation speed at which a predetermined linear velocity can be obtained (hereinafter referred to as "synchronizing speed")) or in an unstable state (i.e., a state in which the rotation speed is deviated from the synchronizing speed and varying) and, when the disc motor 3 is in the stable state, produces a frame correct synchronizing signal SYEQ. This frame correct synchronizing signal generation circuit 1 is constructed in such a manner that, as shown in FIG. 3, a clock signal Pc is reproduced from the EFM signal by a clock reproduction circuit 15 and a counter 16 performs a counting up operation using this reproduced clock Pc while a frame synchronizing signal reproduction circuit 17 detects a frame synchronizing signal appearing first in each frame of the EFM signal, the counter 16 is reset to repeat the counting from the outset each time a detection signal (reproduced synchronizing signal) $P_{22}$ of the detection circuit 17 is generated and, when the timing at which the 588-th count of the counter 16 coincides with the timing at which the detection signal $P_{22}$ is generated, the frame correct synchronizing signal SYEQ is produced through an AND gate 18. As shown in FIG. 4(a), the data format of the compact disc system is such that one frame is constituted of 588 channel bits and the frame synchronizing signal indicating the head of the frame is inserted at the head of each frame. The frame synchronizing signal reproduction circuit 17 detects this frame synchronizing signal and thereupon produces the reproduced synchronizing signal $P_{22}$ (FIG. 4(b)). In the meanwhile, the clock reproduction circuit 15 outputs, on the basis of the past data of the EFM signal, the reproduced clock Pc which constitutes one frame with 588 shots of clock pulses. If, accordingly, the disc motor 3 is rotating stably at the synchronizing speed, an accurate reproduced clock Pc of 588 pulses is obtained between respective reproduced synchronizing signals $P_{22}$, as shown in FIG. 4(c). Accordingly, by counting the reproduced clock Pc by the counter 16 and resetting the counter 16 each time the reproduced synchronizing signal $P_{22}$ is generated, the count of the counter 16 becomes 588 counts whenever the reproduced synchronizing signal $P_{22}$ is produced so that the frame correct synchronizing signal SYEQ is provided in sychronism with the reproduced synchronizing signal $P_{22}$ as shown in FIG. 4(d). If, on the contrary, the rotation speed of the disc motor 3 is deviated from the synchronizing speed, the rotation speed is controlled by the operation of the disc rotation servo to approach the synchronizing speed with a result that the rotation speed varies and therefore the period of generation of the reproduced synchronizing signal $P_{22}$ varies. On the other hand, the reproduced clock Pc which is produced on the basis of the past data of the EFM signal does not instantly follow the variation of the rotation speed. There arises, therefore, difference between the timing of generation of the reproduced synchronizing signal $P_{22}$ and the timing of the 588-th count of the reproduced clock Pc. If, for example, the rotation speed is higher than the synchronizing speed, the period of generation of the reproduced synchronizing signal $P_{22}$ becomes short and a next reproduced synchronizing signal $P_{22}$ is generated before 588 pulses of the reproduced clock Pc are counted. If the rotation speed is lower than the synchronizing speed, the period of generation of the reproduced synchronizing signal $P_{22}$ becomes long with a result that 588 pulses of the reproduced clock Pc have been counted before a next reproduced synchronizing signal $P_{22}$ is generated. In the above described manner, difference is produced between the timing of generation of the reproduced synchronizing signal $P_{22}$ and the timing of generation of the 588-th count of the reproduced clock Pc when the rotation speed of the disc is deviated from the synchronizing speed and is varying and therefore the frame correct synchronizing signal SYEQ can not be obtained. Thus, whether the disc rotation is in a stable state or in an unstable state is detected by presence or absence of the frame correct synchronizing signal SYEQ.

Reverting to FIG. 2, a disc motor drive control circuit 2 controls the rotation of the disc motor 3. This control is effected by employing two kinds of PWM (pulse width modulated) drive signals DM+ and DM−. These drive signals DM+ and DM− do not coexist but driving in the direction of forward rotation is made by the drive signal DM+ and driving in the direction of reverse rotation (i.e., braking against the forward rotation) by the drive signal DM−. The rotation speed is controlled by the pulse widths of the drive signals DM+ and DM−. In the case of the drive signal DM+, the larger the pulse width, the higher the rotation speed whereas the smaller the pulse width, the lower the rotation speed. In the case of the drive signal DM−, the larger the pulse width, the larger the braking effect whereas the smaller the pulse width, the smaller the braking effect.

An optical system servo circuit 4 controls position of an optical system which irradiates light beam on a disc 5 and receives the reflecting light and comprises servo circuits for focusing servo, tracking servo and feed servo.

A focus control circuit 6 controls focusing of the light beam, supplying a focus out signal FCO to the disc motor drive control circuit 2 and correcting focus when the light beam is out of focus. In correcting focus, the circuit 6 produces an initial set signal FCS to return a focus actuator (not shown) to its initial position and then feeds the focus actuator from the initial position until detection of the reflected light by a 4-split photodiode, i.e., the focus has fallen within the vicinity of a correct focusing point (a detection signal FRF is produced). Upon detection of zero-crossing of a difference signal between two diagonal outputs of the 4-split photodiode (a detection signal FZC is produced), it has been judged that the light beam is now in focus so that generation of the focus out signal FCO is terminated and the focus actuator is stopped.

A tracking control circuit 7 controls position of the light beam in the radial direction of the disc 5 so that the light beam will catch the track on the disc 5, effecting a rough control by displacing an entire optical head by means of a feed motor and effecting a precision control by displacing a relative position of an object lens provided in the optical head by means of a tracking actuator. Among various control signals produced by the tracking control circuit 7, TROF is a tracking servo-off signal for terminating a tracking servo in such a search operation as random accessing, TRGL is a signal for switching a tracking servo gain to a high gain for facilitating catching of a track after performing of track jump, TRHD is a hold signal for temporarily holding a tracking error signal used for the tracking control. In order to prevent the tracking servo from becoming unstable after feeding or track jump (kick) due to action of a tracking error signal which is generated by crossing of the light beam over the track, the tracking error signal caused by feeding or track jump is temporarily held and, after completion of feeding or track jump, the tracking control is resumed by the tracking error signal which has thus been temporarily held. KP+ is a kick pulse in a positive direction (i.e., the displacement of the tracking actuator is in the radially outward direction) and KP− is a kick pulse in a negative direction (i.e., the displacement of the tracking actuator is in the radially inward direction). FEM± are feed signals for compulsorily driving the feed motor in a search mode or some other mode in which FEM+ is a drive signal in the radially outward direction and FEM− is a drive signal in the radially inward direction. FEOM is a signal for keeping the feed servo in an off state while the feed signals FEM± are produced.

An input device 8 includes operation switches for setting operation modes such as reproduction, search, fast feeding and returning and setting a music number in the search mode. A microcomputer 9 issues various operation commands in accordance with the operation of the input device 8. Naming and contents of these operation commands provided by the microcomputer 9 are described below.

---

0 mode (STOP)
    a command stopping all operations
1 mode (FEED)
  (a) 1-0 mode (FEED FORWARD)
    a command feeding the optical head radially outwardly
  (b) 1½ mode (FEED RETURN)
    a command returning the optical head by feeding it radially inwardly to the end position when, for example, reproduction has been completed.
2 mode (FOCUS START)
    a command focusing the light beam
3-0 mode (DISC START)
    a command for detecting, when a tray for placing a disc thereon is received in the compact disc player, whether the disc is on the tray or not by rotating the disc by a small number of rotation and measuring resulting inertia
3½ mode (DISC BRAKE)
    a command applying brake (applying reverse voltage) to the disc rotating motor
4 mode (PLAY)
    a command performing reproduction of the disc
5 mode
  (a) 5-0 mode (▷▷+): fast feed command
  (b) 5½ mode (▷▷−): return command
6 mode
  (a) 6-0 mode (▷▷▷+): high speed fast feed command
    When the operation for the 5-0 mode is performed for 2 seconds for example, the operation mode changes automatically to this mode.
  (b) 6½ mode (▷▷▷−): high speed return command
    When the operation for the 5½ mode is performed for 2 seconds for example, the operation mode changes automatically to this mode.
7 mode (SEARCH)
    a command searching an object address

---

The command signals issued by the microcomputer 9 are received by a command register 10 through an input/output circuit 12, decoded by a command decoder 11 and thereafter applied to the disc motor drive circuit 2 and the tracking control circuit 7. The disc motor drive circuit 2 produces the drive signals DM± so as to obtain rotation of the disc motor 3 corresponding to these commands. The tracking control circuit 7 performs tracking control corresponding to these commands. The state of the tracking (e.g., difference between a target position and a present position in the search mode) is transmitted to the microcomputer 9 and utilized for changing the command from the search mode to the reproduction mode when the target position has been reached. A display device 13 displays e.g. time information of a reproduced position and the music number set in the search mode. A memory circuit 14 stores information such as the music number set in the search mode.

Figure 5:
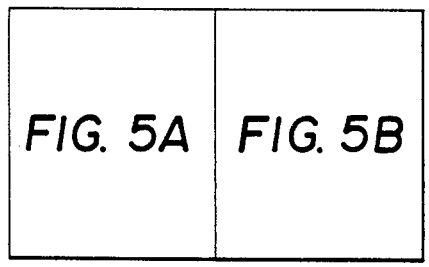
FIG. 5 which is split into 5A and 5B is a block diagram showing an example of the disc motor drive control circuit 2 in FIG. 2.

An example of construction of the disc motor drive control circuit 2 is shown in FIG. 5. In FIG. 5, a synchronization detection circuit 19 produces from the EFM signal a frame synchronizing signal which is synchronized with the frame of the EFM signal and a symbol synchronizing signal which is synchronized with the symbol in the EFM signal. More specifically, the synchronization detection circuit 19 detects and outputs the frame synchronizing signal at the head of each frame in the reproduced EFM signal. The circuit 19 comprises a counter which counts up a reproduced clock of 588 pulses reproduced from the EFM reproduced signal and, each time the frame synchronizing signal is detected, resets the count and repeats counting-up from 0. In case the frame synchronizing signal has not been obtained due to dropout of the reproduced signal or the like cause, the circuit 19 outputs a substitution signal for the frame synchronizing signal. Thus, even if the frame synchronization signal has not been detected in the reproduced EFM signal, the frame synchronizing signal is always produced.

The synchronization detection circuit 19 also produces the symbol synchronizing signal each time the count has reached a multiple of 17. This symbol synchronizing signal functions to divide 588 channel bits which constitute one frame into symbols each having 17 channel bits. By counting the number of the symbol synchronizing signals from the head of the frame, the symbol position in the frame can be detected.

A change detection circuit 21 detects change from "1" to "0" or from "0" to "1" in the EFM signal. A pattern judgement circuit 22 judges whether a predetermined linear velocity is being obtained or not from the pattern of the EFM signal on the basis of a detection signal of the change detection circuit 21. For the EFM signal, a pattern in which "1" continues for 11 channel bits and then "0" continues for 11 channel bits is determined as the largest pulse width for the frame synchronizing signal and there is no other pattern in one frame in which "1" or "0" continues for 11 channel bits or more. Accordingly, by preparing a clock (4.32 MHz) in a crystal oscillator by dividing 136 μs corresponding to the time of one frame when an accurate linear velocity is being obtained (hereinafter referred to as "one frame period") by 588 and counting by this clock a time period during which "1" or "0" of the EFM signal continues, the actual linear velocity can be judged to be slower than the normal linear velocity if there is a portion in which "1" or "0" continues for 12 counts or more whereas it can be judged to be faster than the normal linear velocity if there is no portion in which "1" or "0" continues for 11 counts and also there is no portion in which "1" or "0" continues for 12 counts or more. The pattern judgement circuit 22 thus judges whether the actual linear velocity is faster or slower than the normal linear velocity on the basis of the EFM signal and outputs a judgement signal DE when the actual linear velocity is faster and a judgement signal AE when the actual linear velocity is slower. The pattern judgement circuit 22 further detects whether there has been change in the EFM signal for each frame in order to detect rotation and stopping of the disc and renders the judgement that the disc is rotating when there is change even once in one frame period, producing a judgement signal PX.

A counter circuit 23 has two functions: Firstly, the counter circuit 23 is used to judge by the frame correct synchronizing signal SYEQ and its inverted signal $\overline{SYEQ}$ (a signal representing that the rotation is unstable) whether or not the rotation of the disc maintains a stable state and secondly the counter circuit 23 is used to judge by the rotation detection signal PX whether the rotation of the disc has been stopped or not. Switching of these functions of the counter circuit 23 is made by a command signal S3½ for the 3½ mode from the microcomputer 9. When the command signal S3½ is not issued, i.e., in operation modes other than one in which brake is applied to the rotation of the disc, the judgement as to whether the disc rotation is stable or unstable is made. When the command signal S3½ is issued, i.e., brake is applied to the rotation of the disc, the judgement as to whether the disc rotation is stable or unstable need not be made and the judgement as to whether the disc rotation has stopped or not is made in accordance with the signal PX.

The judgement by the counter circuit 23 as to whether the disc rotation is stable or unstable is effected by having +4 and −1 corresponding respectively to the frame correct synchronizing signal SYEQ derived for each frame and to the frame non-synchronizing signal $\overline{SYEQ}$ and causing the counter circuit 23 to count up by 4 each time the frame correct synchronizing signal SYEQ is generated and count down by 1 each time the frame non-synchronizing signal $\overline{SYEQ}$ is generated. If the stable state of rotation continues, the count of the counter circuit 23 increases and it is judged that the stable rotation is sustained when the count has reached a certain predetermined value (e.g. 1024 counts in the present embodiment). A PLL flag thereupon is up in a register 32 and the disc rotation control is switched to the phase control by a phase-locked loop. If the disc rotation becomes unstable after the PLL flag has once been up, the counter circuit 23 counts down by 1 each time the frame non-synchronizing signal $\overline{SYEQ}$ is generated. The PLL flag is down when the count returns to 0 and the disc rotation control is switched from the PLL phase control to a direct control by a predetermined drive signal to promptly restore the disc rotation to the normal state.

The judgement by the counter circuit 23 as to whether the disc rotation has stopped or not is effected by counting a disc stop detection signal $\overline{PX}$ which is prepared by inverting the disc rotation detection signal PX by an inverter 105. More specifically, when the operation mode has been changed to the 3½ mode, the count for judging whether the disc rotation is stable or unstable is reset and the disc stop detection signal $\overline{PX}$ is counted every one frame period. When the count of the disc stop detection signal $\overline{PX}$ has reached 4, it is judged that the disc has completely stopped and a 4 flag is up in a register 34. This 4 flag is inverted by an inverter 35 and used as a brake enable signal BE for commanding release of application of the reverse voltage for braking.

Figure 6:
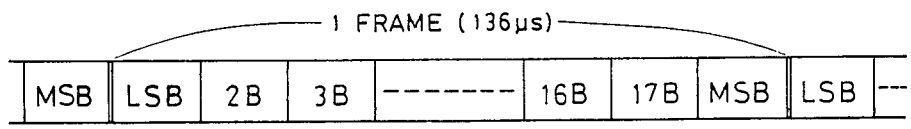
FIG. 6 is a diagram for explaining control signals LSB, 2B . . . , MSB.

The counter circuit 23 having the above described functions comprises a serial counter consisting of the 18-bit shift register 24 and an adder 25 and a counter control circuit 26. The serial counter is constructed such that a pulse provided from the counter control circuit 26 at a predetermined timing is applied to an A input of the adder 25, a final bit output of the shift register 24 is fed back to a B input of the adder 25 and a carry output Co of the adder 25 is delayed by a register 27 by 1 bit and thereafter is applied to a carry input Ci of the adder 25. Since the 18-bit shift register 24 is shifted by clocks $\phi A$ and $\phi B$ which are obtained at an internal clock generator 40 by dividing one frame period by 18, shifting completes 1 cycle in each one frame period. When the counter 23 is used for judging whether the disc rotation is stable or unstable, the counter control circuit 26 applies a signal "1" to the A input of the adder 25 at a timing of 3B of each frame in which the frame correct synchronizing signal SYEQ is generated. The timing of 3B means, as illustrated in FIG. 6, the third bit counting from LSB in 18 counts in one frame period counted by the clocks $\phi A$ and $\phi B$ and corresponds to the state in which a signal "1" of the third bit counting from LSB of the count of the shift register 24 is supplied from the shift register 24 to the B input of the adder 25. Since the third bit from LSB corresponds to 4 in the decimal notation, entering "1" in this bit is equivalent to adding 4. The counter control circuit 26 outputs "1" during one frame period each time the frame non-synchronizing signal $\overline{SYEQ}$ is generated and adds "1" to all bits of the shift register 24, i.e., performing subtraction of 1. When the count of the shift register 24 has reached 1024, a register 31 is set to produce 1k flag. This 1k flag is a signal representing that the stable rotation is sustained. Upon setting of the 1k flag, the register 32 is set and the above described PLL is produced, indicating the stable rotation state. When the rotation has become unstable, the shift register 24 counts down but the PLL flag remains in the set state until the count returns to 0. When the count has returned to 0, the register 33 is set, 0 flag is up, the register 32 is reset and the PLL flag is down, whereby the unstable rotation state is indicated.

Figure 7:
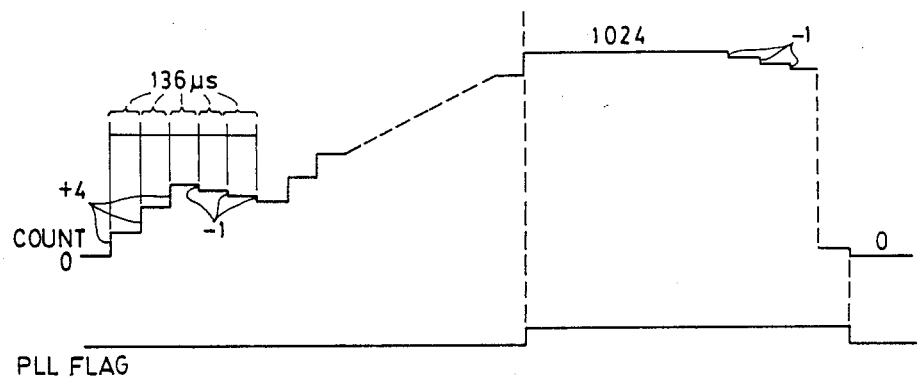
FIG. 7 is a diagram for explaining the operation of a counter circuit 23.

FIG. 7 shows relationship between the count of the shift register 24 and the PLL flag. The count increases by 4 from start of counting each time the frame correct synchronizing signal SYEQ is generated and decreases by 1 each time the frame non-synchronizing signal $\overline{SYEQ}$ is generated. When the stable rotation has continued until the count has reached 1024, the PLL flag is up indicating the stable rotation state. If the rotation thereafter becomes unstable and counting down continues, the PLL flag is down when the count has become 0 representing the unstable rotation state.

Figure 5A:
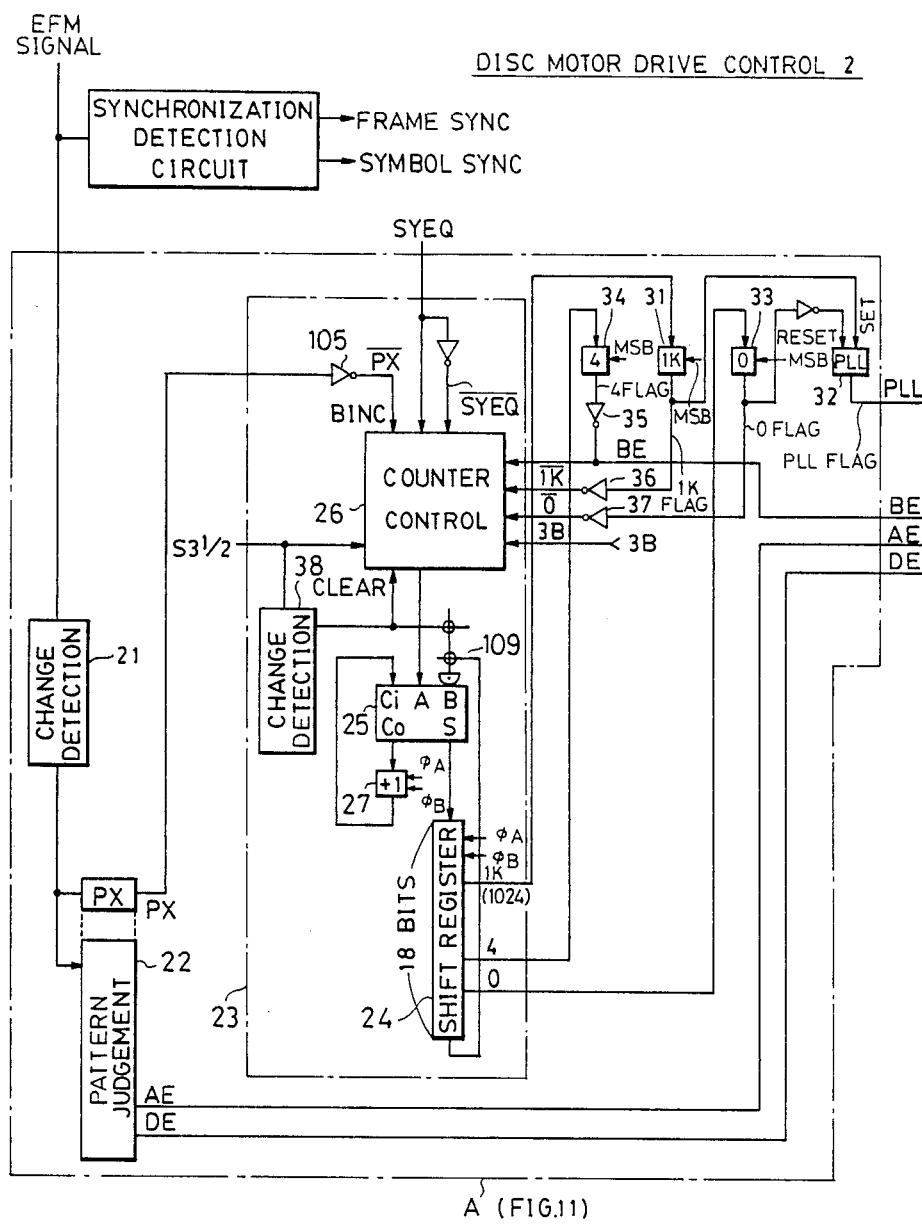
Figure 5B:
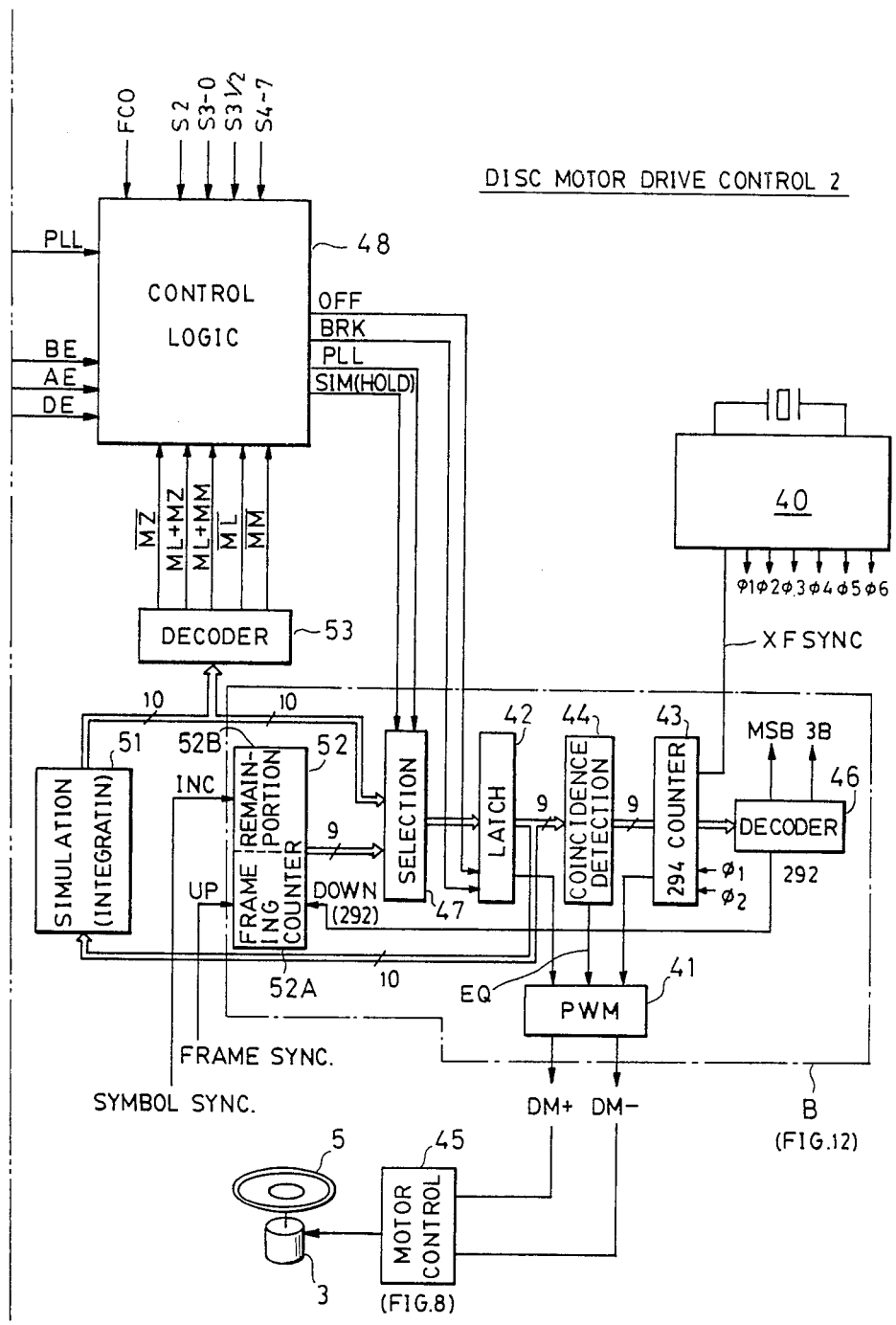

In the counter circuit 23 in FIG. 5A, a change detection circuit 38 detects rising of the command signal of the 3½ mode and thereupon the count in the counter circuit 23 is reset and the stop detection signal $\overline{PX}$ is counted each one frame period. Upon reaching of the count to 4, the register 34 is set to output 4 flag. This 4 flag is inverted by an inverter 35 and utilized as the brake enable signal BE. A state in which the brake enable signal BE is "1", i.e., a state in which the count has not reached 4 signifies that the disc is still rotating. In the 3½ mode, stopping of rotation of the disc is detected by falling of this signal BE, i.e., a state in which the count has reached 4, and thereupon application of the reverse voltage for braking is ceased. Upon falling of the command signal of the 3½ mode, the count is reset again for preparing for counting of the frame correct synchronizing signal SYEQ and the frame non-synchronizing signal $\overline{SYEQ}$ in a next mode.

The registers 31-34 outputting the respective flags are renewed once for each frame at the timing of the signal MSB (FIG. 6). The brake enable signal BE, a signal 1k derived by inverting the $\overline{1k}$ flag by an inverter 36 and a signal $\overline{0}$ derived by inverting the 0 flag by an inverter 37 are respectively used for stopping counting in the counter circuit 23.

A coincidence detection circuit 44 detects coincidence of an output of a latch circuit 42 and an output of a counter 43 which is driven by a clock prepared in an internal clock generator 40 associated with a crystal oscillator and which circulates in one frame period. A PWM circuit 41 produces the motor drive signals DM± with a pulse width determined on the basis of the detection of coincidence by the circuit 44 to drive the disc motor 3 through a motor control section 45.

Figure 8:
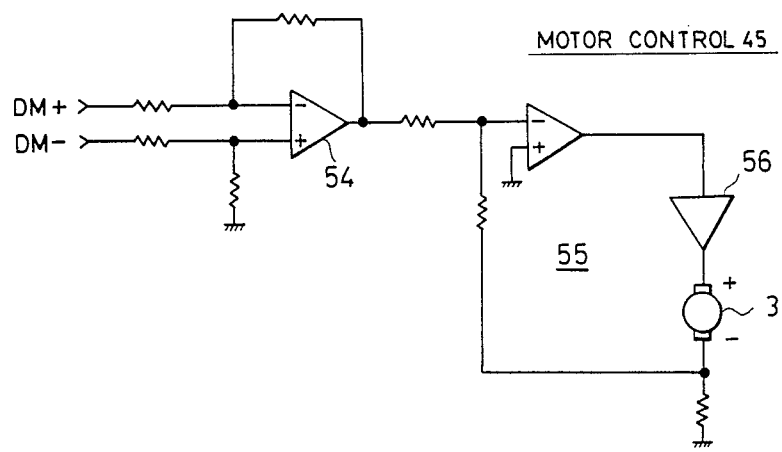
FIG. 8 is a circuit diagram showing a specific example of a motor control circuit 45.

The motor control section 45 is constituted of, e.g., a constant current circuit 55 as shown in FIG. 8. In this example, the motor drive signals DM± are applied through an amplifier 54 and used to drive the disc motor 3 through a drive amplifier 56.

Reverting to FIG. 5, the counter 43 is a counter counting 294 counts from 0 to 293. The counter 43 is driven by its own clocks $\phi 1$ and $\phi 2$ of 294 pulses for one frame period (2.1609 MHz) prepared by internal clock generator 40, completing its cycle in one frame period. A decoder 46 decodes the count of the counter 43. The signals LSB, 2B, 3B, ..., 17B and MSB shown in FIG. 6 which are derived by dividing one frame period by 18 are also produced in the decoder 46. The latch circuit 42 latches data controlling the pulse width of the motor drive signals DM± which are pulse width modulated signals. Data to be latched is determined by the control mode signals PLL, SIM, OFF and BRK from a control logic 48. The coincidence detection circuit 44 detects coincidence of the outputs of the latch circuit 42 and the counter 43 for controlling timings of rise and fall of the motor drive signals DM±. Since the counter 43 completes one cycle in one frame period, a coincidence signal is obtained every one frame period and one shot of pulse of the motor drive signals DM± thereby is produced. A selection circuit 47 selectively outputs an output of a simulation circuit 51 or an output of a frame remaining portion counter 52 in response to the signals PLL and SIM from the control logic 48 and for causing the output to be latched by the latch circuit 42.

A frame remaining portion counter 52 is provided for detecting difference between the EFM signal reproduced from the disc and the internal clock prepared by the clock generator 40. The frame remaining portion counter 52 consists of an upper counter 52A and a lower counter 52B. The upper counter 52A detects difference on the frame basis. The upper counter 52A consists of an up-down counter, being counted up by one count for each frame of the EFM signal by the frame synchronizing signal of the EFM signal which has been detected by the synchronization detection circuit 19 and being counted down by one count by the internal clock for each one frame period (136 μs). If, accordingly, the actual linear velocity is larger than the normal linear velocity, the counter 52A more often counts up than counts down so that the count increases whereas if the actual linear velocity is smaller than the normal linear velocity, the counter 52A more often counts down than counts up so that the count decreases. The lower counter 52B detects difference in phase between the frame synchronizing signal of the EFM signal and the frame synchronizing signal of the internal clock. The lower counter 52B is reset for each one frame of the EFM signal by the frame synchronizing signal of the EFM signal and counts up the symbol synchronizing signal produced by the synchronization detection circuit 19 which is synchronized with the symbol of the EFM signal (a signal produced every 17 channel bits of the EFM signal). The lower counter 52B itself always reaches a predetermined count value every one frame by the symbol synchronizing signal regardless of the phase difference. Since the count of the lower counter 52B is latched by the latch circuit 42 by the PLL control mode signal which is produced at a timing of a 293 count signal which, as will be described later, is generated once in one frame synchronized with the internal clock, the timing of latching varies depending upon the magnitude of the phase difference and the latched count value corresponds to the magnitude of the phase difference within one frame.

The simulation circuit 51 integrates the output of the latch circuit 42 with a certain time constant (e.g., 18 sec). Since the output data of the latch circuit 42 determines the pulse width of the disc motor drive signals DM±, an integrated value of this data is an average value of the pulse width of the disc motor drive signals DM± for a certain period of time, representing the present state of rotation of the disc motor 3. When the phase control by the signal PLL is not available in the reproduction mode because of unavailability of a reproduced clock for the reason that the light beam is not in focus, the output of the simulation circuit 51 is selected by the SIM control mode signal from the control logic 48 and latched in the latch circuit 42 for utilization for production of the disc motor drive signals DM±. The latched value is fed-back to the simulation circuit 51 so that the output of the simulation circuit 51 maintains a predetermined value. The disc motor 3 therefore maintains the rotation speed before switching to the SIM control mode. Since the output of the simulation circuit 51 represents the state of rotation of the disc motor 3, this output is applied to the control logic 48 through a decoder 53 and used for switching of the control mode.

The decoder 53 decodes the output of the simulation circuit 51 and outputs five different signals of $\overline{MZ}$, ML+MZ, ML+MM, $\overline{ML}$ and $\overline{MH}$. MH, MM, ML and MZ denote signals respectively having the following velocity ranges:

MH: +2000 rpm and over
MM: +100 to 2000 rpm
ML: 0 to +100 rpm
MZ: 0 rpm or less (reverse rotation)

The control logic 48 receives operation mode signals $S_2$-$S_7$ from the microcomputer 9 (FIG. 2), a focus state indicating signal FCO representing whether the light beam is in focus or not, the signal PLL representing stable rotation from the register 32, the signals BE, AE and DE and the signals MH-MZ representing the disc rotation states and delivers out a selected one of the control mode signals PLL, SIM, OFF and BRK. These control mode signals perform the function of determining data to be latched in the latch circuit 42 and thereby implementing the control mode corresponding to the latched data. Data latched in the respective control modes and contents of the control are as follows:

(a) PLL control mode

Output data of the frame remaining portion counter 52 representing difference between the EFM signal reproduced from the disc and the internal clock prepared by the crystal oscillator is selectively provided by the selection circuit 47 and latched in the latch circuit 42. Rotation control of the disc motor 3 by the PLL phase control thereby is performed.

(b) SIM (HOLD) control mode

Output data of the simulation circuit 51 is selected by the selection circuit 47 and latched in the latch circuit 42. A control for maintaining the present rotation speed thereby is performed.

(c) OFF control mode

Data for turning the drive signals DM± to "0" over the entire width (DM+ =0, DM− =0) is compulsorily latched in the latch circuit 42 and a direct control by this data is performed. Since DM± =0, the disc drive motor 3 is not driven but the disc 5 is rotated only by inertia.

(d) BRK control mode

Data for turning the drive signals DM− to "1" over the entire width (DM+ =0, DM− =1) is compulsorily latched and a direct control by this data is performed. Since a drive force in the reverse direction is applied at this time, brake is applied to the forward rotation.

(e) FO control mode

When none of the control mode signals PLL, SIM, OFF and BRK is produced, the operation mode becomes FO control mode. In this mode, data for turning the drive signal DM+ to "1" over the entire width (DM+ =1, DM− =0) is compulsorily latched and a direct control by this data is performed. Since a drive force in the forward direction is applied, the disc motor 3 is accelerated in the forward direction.

Figure 9:
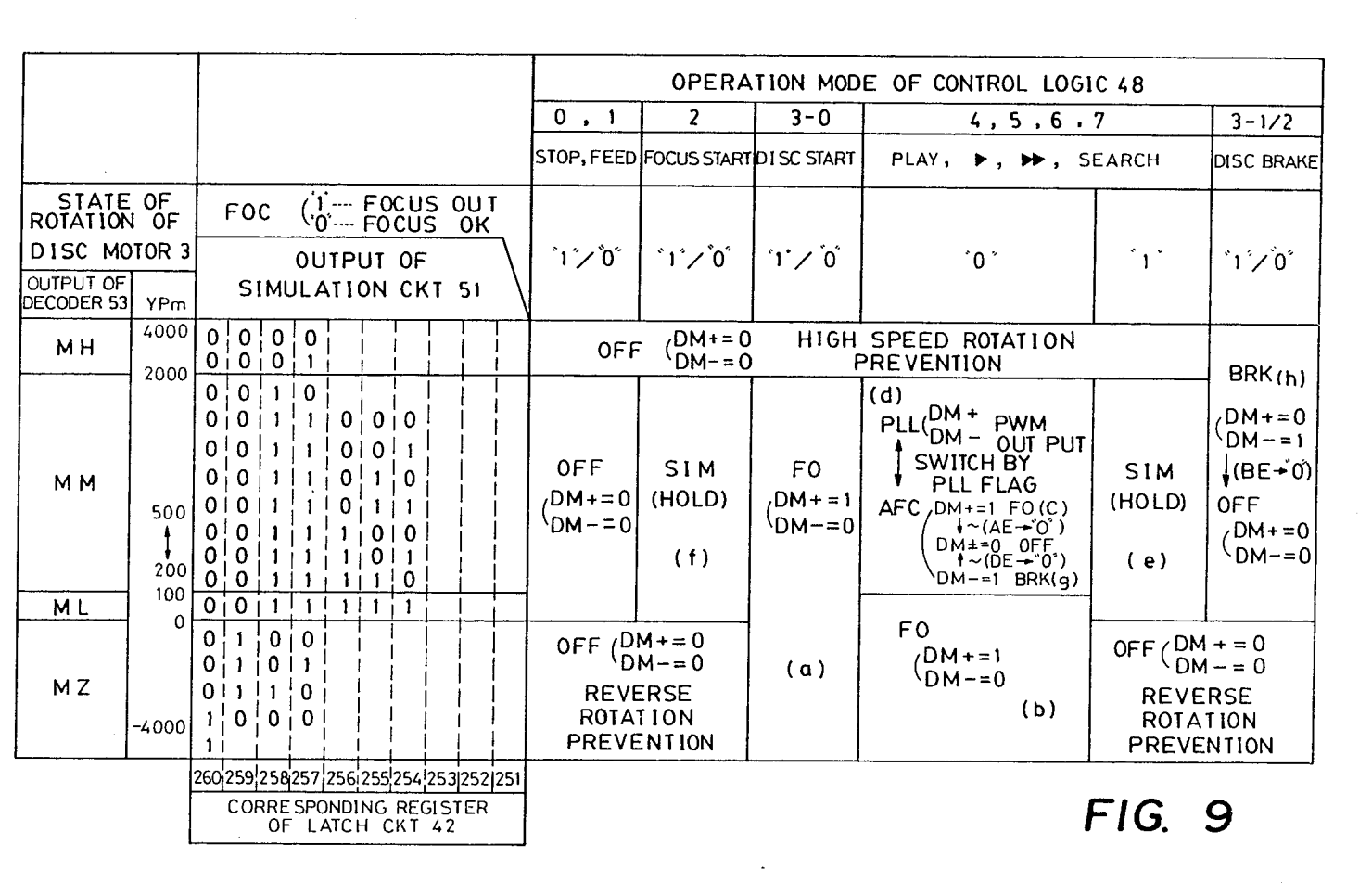

The control logic 48 implements these five control modes of PLL, SIM, OFF, BRK and FO, selecting one of them according to the operation modes 0–7, the state of rotation of the disc motor 3, the state of focusing and presence or absence of PLL flag as shown in FIG. 9. Switching of the control mode in the respective operation modes 0–7 will now be described.

(a) 0 (STOP) and 1 (FEED) modes

Rotation of the disc is unnecessary so that the OFF control mode is used over the entire speed range.

(b) 2 (FOCUS START) mode

The 2 mode is a mode for performing a focusing operation when the light beam is not in focus. No reproduced clock therefore is obtained in this mode and hence the PLL control mode is not available. Accordingly, control is performed in the simulation circuit 51 in a SIM control mode. In the speed range of MH, the OFF control mode is used for preventing a high speed rotation. In the speed range of MZ, the OFF control mode is also used for preventing reverse rotation.

(c) 3 (DISC START) mode

Since the DISC START mode is a mode in which the disc motor 3 is rotated by a small number of rotation when a tray for placing a disc thereon is received in the compact disc player to detect whether the disc is on the tray or not by measuring inertia, the disc motor 3 is accelerated in the FO control mode. Upon entering the speed range of MH, the control mode is switched to the OFF control mode for preventing a high speed rotation.

(d) 4 (PLAY), 5-0 (FAST FEED), 5½ (RETURN), 6-0 (HIGH-SPEED FAST FEED), 6½ (HIGH-SPEED RETURN) and 7 (SEARCH) modes When the light beam is in focus and the PLL flag is in a risen state, a lock control in the PLL control mode is performed by using the frame remaining portion counter 52.

When the light beam is in focus but the PLL flag has not risen, AFC (automatic frequency control) is performed using the signals AE and DE. When the signal AE is being produced (i.e., the actual linear velocity is smaller than the normal linear velocity), the FO control mode is used to accelerate the rotation. When the signal DE is being produced (i.e., the actual linear velocity is larger than the normal linear velocity), the BRK control mode is used to decelerate the rotation. Upon reaching of the normal linear velocity by the employment of the FO control mode or the BRK mode and disappearing of the signal AE or DE, the control mode is changed to the OFF control mode. Upon setting of the PLL flag, the control mode is changed to the PLL control mode. In the speed range of MH, the OFF control mode is used for preventing a high speed rotation. In the speed ranges of ML and MZ, the FO control mode is used for accelerating the disc motor 3 in the forward direction.

When the light beam is out of focus, the reproduced clock is not derived so that the PLL control mode or AFC control mode cannot be employed. In this case, therefore, the SIM control mode by the simulation circuit 51 is employed. Upon coming of the light beam in focus in the SIM control mode, the control mode is changed to the PLL control mode or the AFC control mode. In the speed range of MH, the OFF control mode is used for preventing a high speed rotation. In the speed range of MZ, the OFF control mode is used for preventing reverse rotation.

(e) 3½ (DISC BRAKE) mode

In this mode, the rotation of the disc motor 3 is decelerated by applying reverse voltage. Upon detecting of stopping of the disc motor 3 by the brake enable signal BE="0", the BRK control mode is reset. In the speed range of MZ, the OFF control mode is used for preventing reverse rotation.

Figure 10:
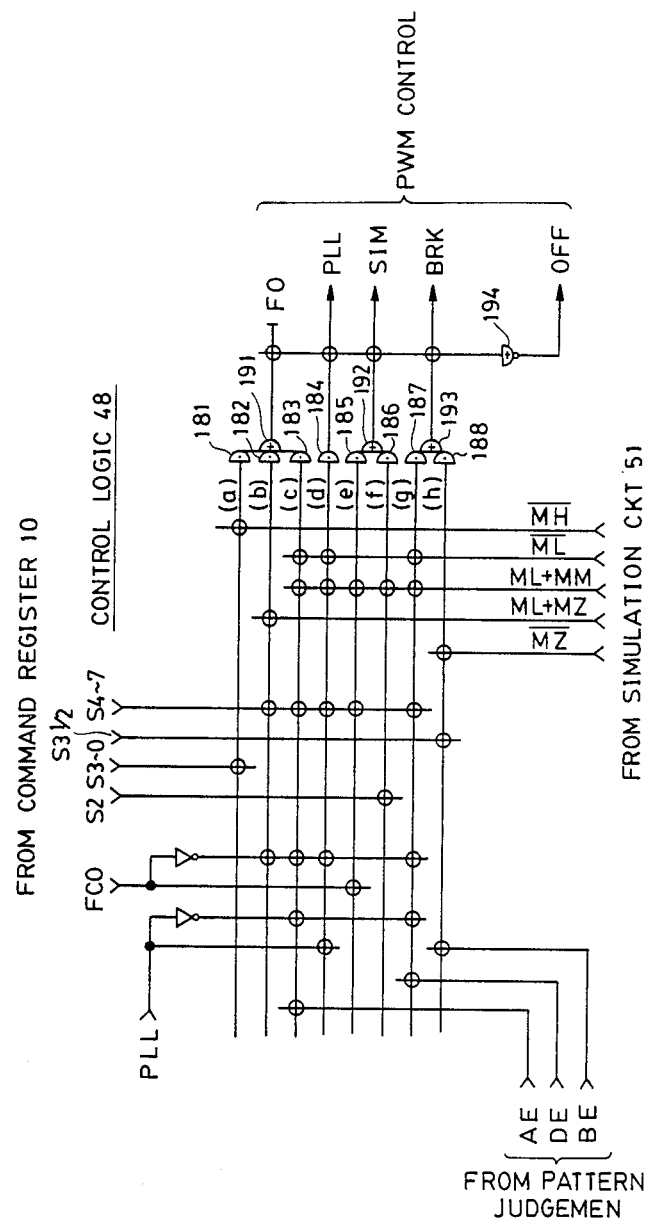
FIG. 10 is a circuit diagram showing an example of the control logic 48.
Figure 11B:
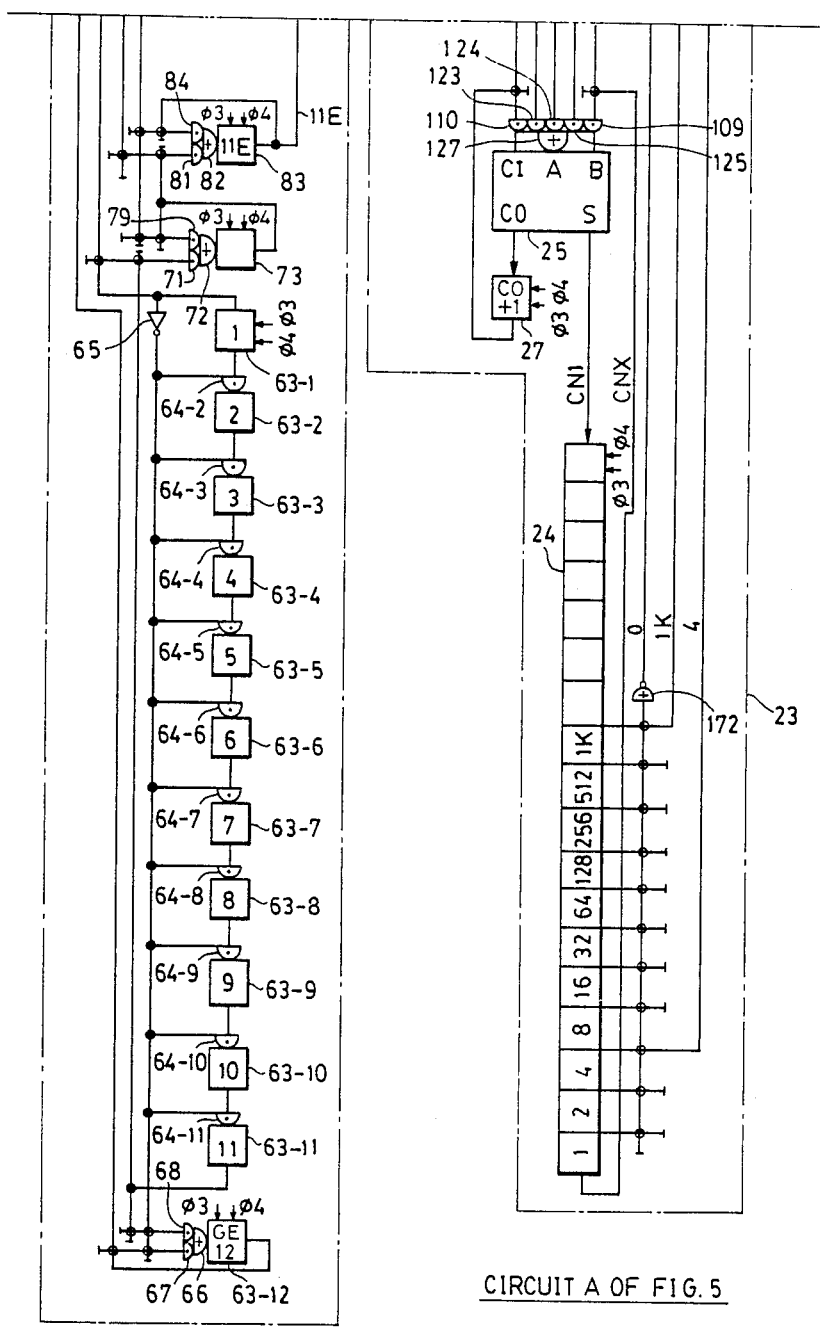
Figure 12A:
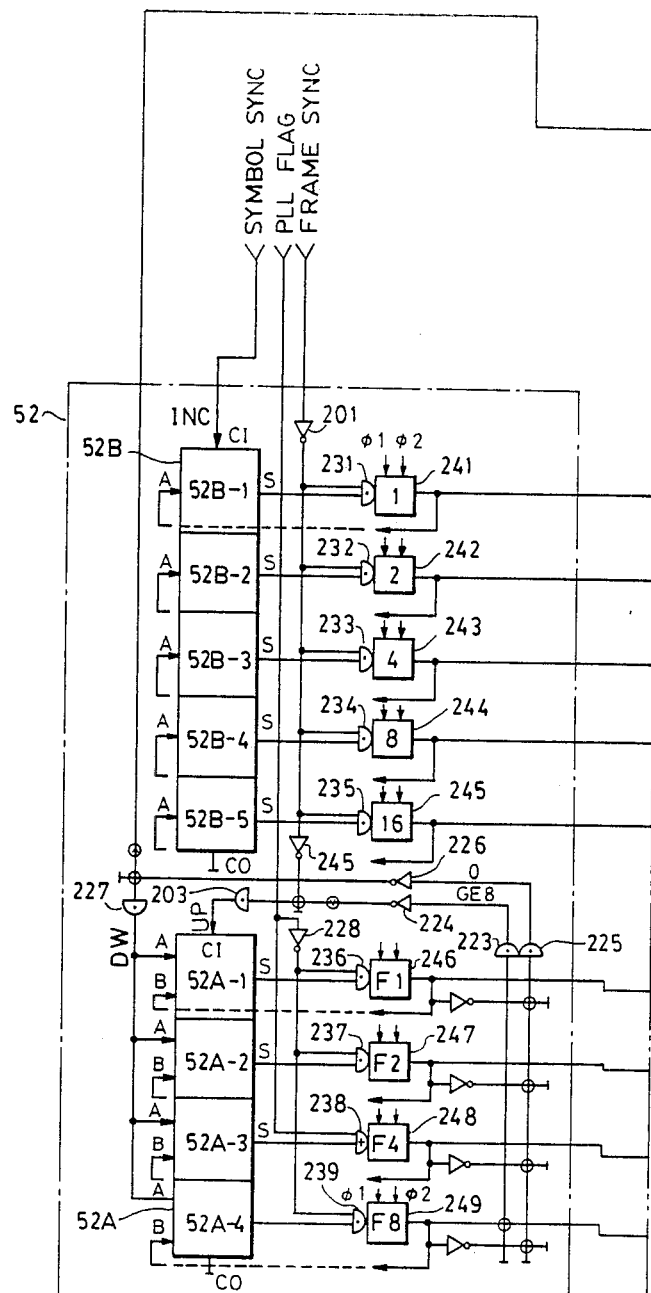
FIGS. 12A, 12B and 12C is a circuit diagram showing an example of the circuit designated by reference character B in FIG. 5.
Figure 12B:
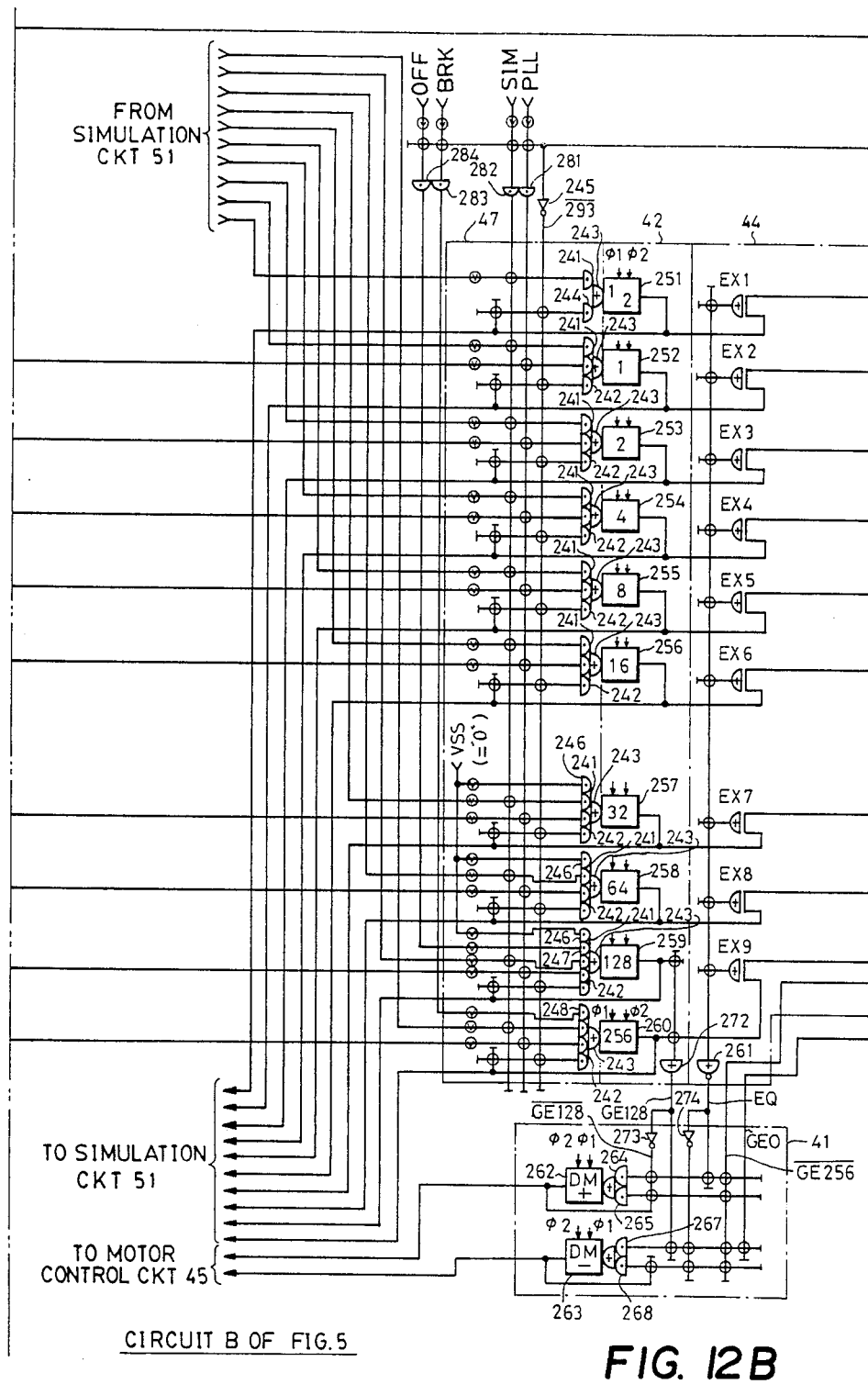
Figure 12C:
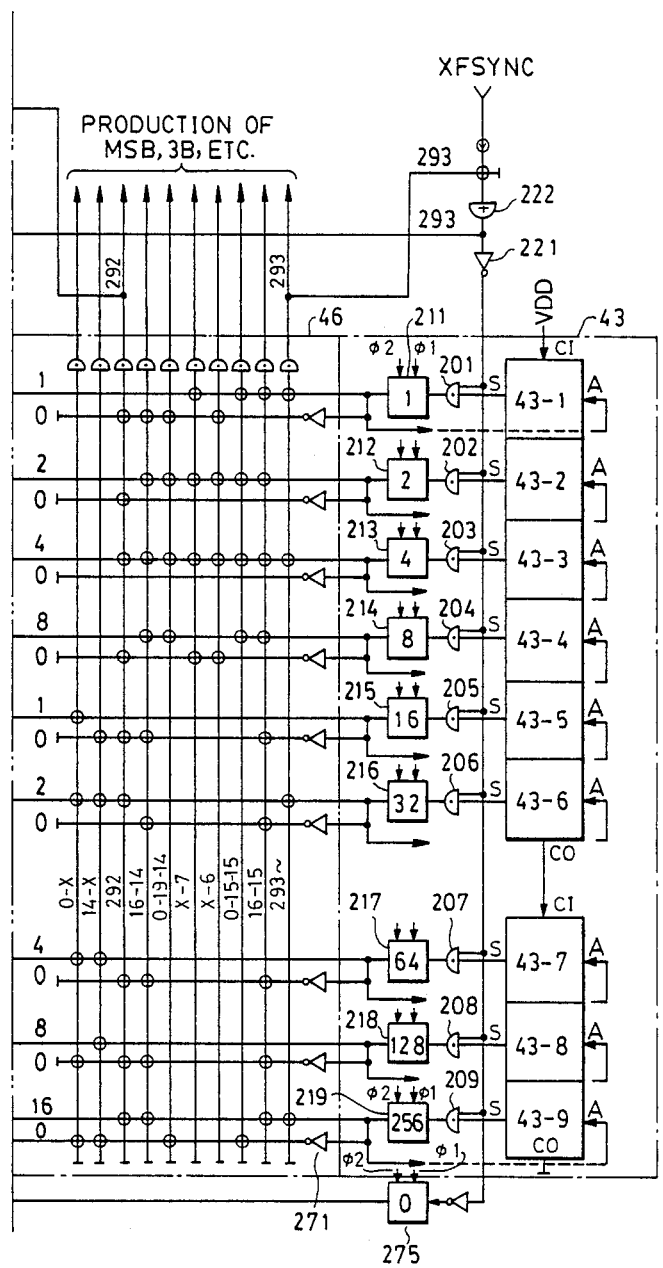

FIG. 10 shows an example of construction of the control logic 48 for performing the control illustrated in FIG. 9. Regions of FIG. 9 corresponding to AND gates 181–188 are denoted by reference characters (a)–(h) in FIG. 9. There is no AND gate corresponding to the region of the OFF control mode because the region which does not correspond to any of the AND gates 181–188 is treated as the OFF mode. Outputs of the AND gates 183–188 are combined by an OR gate 191 to constitute a signal commanding the FO control mode. The output of the AND gate 184 constitutes a signal commanding the PLL control mode. The outputs of the AND gates 185 and 186 are combined by an OR gate 192 to constitute a signal commanding the SIM control mode. The outputs of the AND gates 187 and 188 are combiend by an OR gate 193 to constitute the BRK mode. A NOR gate 194 receives outputs of the OR gates 191, 192 and 193 and the AND gate 184 and produces an output signal "1" when all of these signals are "0". This output signal "1" of the NOR gate 194 constitutes a signal commanding the OFF control mode.

The control logic 48 produces the signals PLL, SIM, BRK and OFF respectively commanding the PLL control mode, the SIM control mode, BRK control mode and OFF control mode. Since the FO control mode can be treated as a state in which none of these control mode signals is produced, the signal commanding the FO control mode from the OR gate 191 is not produced by the control logic 48.

Figure 11:
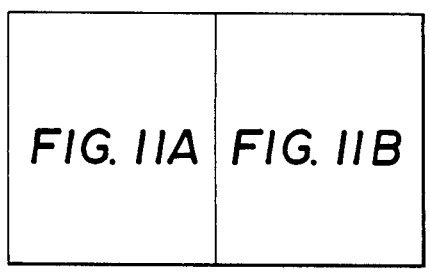
FIG. 11 which is split into

A specific example of the portion designated by A in FIG. 5 is shown in FIG. 11. In FIG. 11, the change detection circuit 21 consists of a 2-bit shift register 61 and an exclusive OR gate 62. The shift register 61 is driven by clocks $\phi 3$ and $\phi 4$ which are produced at a rate of 588 pulses for one frame (4.32 MHz) by the clock generator 40 and shifts the input EFM signal upon matching it in synchronization with the inside clocks $\phi 3$ and $\phi 4$. The exclusive OR gate 62 which receives outputs of the first and second stages of the register 61 produces, at each rise and fall of the EFM signal, a signal having a pulse width corresponding to one period (136 $\mu s/588$) of the clock $\phi 3$ or $\phi 4$. For example, a change detection signal as shown in FIG. 14(b) is produced against an EFM signal as shown in FIG. 14(a).

The pattern judgement circuit 22 comprises registers 63-1 through 63-11 which sequentially shift the output pulse of the change detection circuit 21 in response to the clocks $\phi 3$ and $\phi 4$. AND gates 64 are respectively provided on the input side of the registers 63-2 through 63-11 and the output pulse of the change detection circuit 21 is applied to these AND gates 64 through an inverter 65. If, accordingly, a shot of pulse is produced by the change detection circuit 21, this pulse is transmitted from the register 63-1 to the registers 63-2, 63-3, . . . as long as a signal "0" subsequently appears successively. If a pulse is then applied, the AND gates 64-2 through 64-11 is disabled and the preceding pulse which has been transmitted disappears. Consequently, the eleventh register 63-11 is set only when 11 signals "0" or "1" successively appear in the original EFM signal. The output "1" of the register 63-11 therefore indicates that there are at least eleven consecutive 0's in the EFM signal. The output of the register 63-11 is applied to a register 63-12 together with the output of the inverter 65 through an AND gate 68 and an OR gate 66. The register 63-12 therefore is set when there is no change in the EFM signal at a bit next to the bit at which the register 63-11 is set, i.e., when there are twelve consecutive 0's. This set state of the register 63-12 is self-held through the AND gate 67 until a next change occurs in the EFM signal.

The output of the register 63-11 is applied to a register 73 together with the change detection signal through an AND gate 71 and an OR gate 72. Setting of the register 73 therefore indicates that a change has occurred after there have been eleven consecutive 0's, i.e., there has been a portion in the EFM signal in which eleven 0's or 1's have successively appeared. The register 73 can also detect a state in which the disc rotation is deviated from the synchronizing speed. More specifically, if the disc rotation is faster than the synchronizing speed, the pattern of the frame synchronizing signal is shortened and a next signal "1" is produced by the change detection circuit 21 before the first signal "1" reaches the register 63-11 so that a signal "1" is not produced from the AND gate 71 and the register 73 is not set. If the disc rotation is slower than the synchronizing speed, the pattern of the frame synchronizing signal is prolonged and a next signal "1" is not produced by the change detection circuit 21 even after the first signal "1" has reached the register 63-11 so that a signal "1" is not produced from the AND gate 71 and the register 73 is not set. Accordingly, from the state in which the frame synchronizing detection signal is not produced from the register 73, the state in which the disc rotation is deviated from the synchronizing speed can be detected. The set state of the register 73 is self-held by a signal derived by inverting a signal 587 by an inverter 78. The signal 587 is prepared by applying the signal 293 from the final bit (293 count) of the decoder 46 (FIG. 5) to a 2-bit shift register 75 and further applying the output of the first stage thereof and a signal derived by inverting the output of the second stage thereof by an inverter 76 to an AND gate 77. This signal 587 corresponds to a signal of the final bit obtained when one frame is divided by 588 into 0–587 bits. The self-holding of the register 73 therefore is released at the end of the frame and renewed. The output of the register 73 is applied to an AND gate 73 together with the signal 587 and applied to a register 83 through an OR gate 82. Accordingly, as the register 73 is set, the register 83 also is set at the end of that frame. The set state of the register 83 is self-held through an AND gate 84 by a signal $\overline{587}$ for one frame until the next signal 587 appears. The state in which the output 11E of the register 83 is "1" therefore indicates that in the preceding frame there has been a portion in the EFM signal in which eleven consecutive 0's appear.

The output of the register 63-12 is applied to an AND gate 85 together with the EFM change detection signal and applied further to a register 87 through an OR gate 86. Since the register 63-12 holds a set state when twelve or more consecutive 0's appear in the EFM signal, the register 87 is set when a next change occurs in the EFM signal. The register 63-12 is reset at this time. The set state of the register 87 is self-held by a signal $\overline{587}$ until the end of that frame through an AND gate 88. The output of the register 87 is applied to an AND gate 91 together with the signal 587 and further applied to a register 93 through an OR gate 92. If the register 87 is set, the register 93 is set at the end of that time. The set state of the register 93 is self-held by the signal $\overline{587}$ during one frame until a next signal 587 appears through an AND gate 94. When, accordingly, twelve or more consecutive 0's appear in the EFM signal and a change thereafter occurs in the EFM signal, a signal "1" is produced from the register 93 during the next one frame. This signal "1" of the register 93 is used as the signal AE, i.e., the actual linear velocity is smaller than the normal linear velocity.

A NOR gate 99 receives the signal 11E and the signal AE and produces a signal "1" when these signals 11E and AE are both "0", i.e., when in the preceding frame there has been neither a portion in which eleven consecutive 0's appear nor a portion in which twelve or more consecutive 0's appear. This signal "1" is used as the signal DE representing that the actual linear velocity is higher than the normal linear velocity.

The EFM change detection signal sets a register 97 through an AND gate 95 and an OR gate 96. This set state is self-held by the signal 587 until the end of that frame through an AND gate 98. If the register 97 is set, a register 103 is set at the end of that frame at a timing of the signal $\overline{587}$ through an AND gate 101 and an OR gate 102 and the set state of the register 103 is self-held through an AND gate 104 during one frame until rising of the next signal 587. An output signal "1" of the register 103 represents that there has been a change in the EFM signal at least once in the preceding frame, i.e., the disc is rotating and is used as the above described signal PX. This signal PX is inverted by an inverter 165 and provided as a signal $\overline{PX}$. The signals AE, DE and $\overline{PX}$ produced by the pattern judgement circuit 22 are renewed frame by frame by the signals 587 and $\overline{587}$.

The change detection circuit 38 supplies the operation signal S3½ of the brake mode to a register 113 through an AND gate 111 and an OR gate 112 at a timing of the signal MSB (FIG. 6) and thereby sets the register 113. The set state of the register 113 is self-held through an AND gate 114 by a signal $\overline{MSB}$ derived by inverting the signal MSB by an inverter 118 and renewed frame by frame by the signal MSB during presence of the signal S3½. Upon falling of the signal S3½, the register 113 is reset at a timing of the next signal MSB. The output of the register 113 and the brake mode signal S3½ are applied to an exclusive OR gate 115. The exclusive OR gate 115 therefore produces a signal "1" upon rising and falling of the brake mode signal S3½ at the timing of the signal MSB. This signal is used for resetting the count of the register 24 in changing the operation mode from some other mode to the 3½ mode or vice versa.

The shift register 24 consists of 18 bits as described previously and completes one cycle of circulation in each one frame period, receiving the signal of the S output of the adder 25 and shifting this signal by the clocks φA and φB derived by dividing 136 μs constituting one frame by 18, and feeding the output of the least significant bit stage to the B input of the adder 25 through an AND gate 109. Data to be added is applied from the A input of the adder 25 and its value differs depending upon the timing at which it is applied. If, for example, the data is applied at a timing of the least significant bit LSB, 1 is added whereas if the data is applied at a timing of the third bit 3B, 4 is added. A carry output Co of the adder 25 is delayed by 1 bit in the register 27 and thereafter applied to a carry input Ci of the adder 25 for effecting carrying.

Three AND gates 123–125 are provided on the side of the A input of the adder 25. The AND gate 123 functions to count the number of frames in which the signal $\overline{PX}$ representing that the disc is not rotating is continuously produced. In the 3½ mode, the AND gate 123 is enabled by the brake mode signal S3½ and the AND gates 124 and 125 are disabled by a signal derived by inverting the brake mode signal S3½ by an inverter 126. If there is no change in the EFM signal during one frame, the signal $\overline{PX}$ becomes "1" and a signal "1" is applied to the A input of the adder 25 at a timing of the signal LSB through the AND gate 123 and an OR gate 127. Thus, the count of the shift register is counted up by 1 count for each frame when the signal $\overline{PX}$ is produced. As the signal $\overline{PX}$ for frame 4 is turned to "1" and the count of the shift register 24 reaches 4, the register 34 is set at a timing of the signal MSB through an AND gate 131 and an OR gate 130. The set state of the register 34 is self-held through an AND gate 133. The output of the register 34, i.e., the above described 4 flag signifies that there has been no change in the 4 frame EFM signal. This 4 flag signal is inverted by the inverter 35 and is used in the 3½ mode as the brake enable signal BE representing that the disc rotation has been stopped and constituting a timing signal for finishing application of the reverse voltage for braking.

When the 4 flag has been up and the brake enable signal BE has become "0", the AND gate 123 is disabled and the counting therefore is stopped. This state is sustained during presence of the brake mdoe signal S3½. When the brake mode signal S3½ has fallen, the change detection circuit 38 detects this falling and thereupon causes the A input and B input of the adder 25 to be interrupted and thereby reset the shift register 24 in the circulation within one frame. The resetting of the shift register 24 causes the register 34 to be released from self-holding and tye brake enable signal BE to return to "1".

In the operation modes other than the 3½ mode, the AND gates 124 and 125 of the A input of the adder 25 are enabled. If the frame correct synchronizing signal SYEQ is produced in this state, this signal SYEQ is caused to match in synchronization with the inside clock and thereafter is applied to a register 144 at a timing of the signal MSB through an AND gate 142 and an OR gate 143 and sets the register 144. The set state of the register 144 is self-held by the signal $\overline{MSB}$ through an AND gate 145 during one frame. As the register 144 is set, a signal "1" is applied to the A input of the adder 25 by the signal 3B through the AND gate 124 at a timing of the third bit from LSB of the shift register 24 and addition of 4 (in the decimal notation) is performed. If the frame correct synchronizing signal SYEQ has not been set, the register 144 is not set so that a signal $\overline{SYEQ}$ is produced through an inverter 146. The signal $\overline{SYEQ}$ is applied to an AND gate 125. Since no signal for indicating timing of addition such as 3B is applied to the AND gate 125, upon application of the signal $\overline{SYEQ}$ to the AND gate 125, a signal "1" is applied to the A input during one frame during which the application of the signal $\overline{SYEQ}$ continues. By this, subtraction of 1 is performed. In each frame, either the signal SYEQ or the signal $\overline{SYEQ}$ is produced and 4 count up (SYEQ) or 1 count down ($\overline{SYEQ}$) thereby is performed.

Upon reaching of the count to 1024 and rising of "1" at a bit corresponding to 1k (1024) of the shift register 24, the register 31 is set at a timing of the signal MSB through an AND gate 151 and an OR gate 152. The set state of the register 31 is self-held during that frame by the signal $\overline{MSB}$ through an AND gate 153. Upon setting of the shift register 31, its output disables the AND gate 123 through the inverter 36 thereby prohibiting further counting up. Counting down, however, is not prohibited and it is performed when the frame non-synchronizing signal $\overline{SYEQ}$ is applied. Since the shift register 31 is reset by counting down, counting up can be made again. In a normal operation time, the count fluctuates below and near 1024.

The output of the bit corresponding to 1k of the register 24 is applied to a register 165 as the 1k flag at a timing of the signal MSB through an AND gate 161 and an OR gate 162 and sets the register 165. The set state of the register 165 is self-held by the signal $\overline{MSB}$ during that frame through an AND gate 164. The PLL flag is produced from the register 165 in the set state. As described above, the count of the shift register 24 fluctuates near 1k after counting up to 1k has been made. The register 165, however, maintains its set state and continues to produce the PLL flag once it has been self-held even if the count of the shift register 24 falls below 1k. If, however, an unstable state of the disc motor continues and therefore count down continues until the count decreases to 0, all bits of the shift register 24 become "0" so that the output of a NOR gate 172 is turned to "1". This signal "1" is applied to a register 175 at a timing of the signal MSB through an AND gate 173 and an OR gate 174 and sets this register 175. The set state of the register 175 is self-held during that frame by the signal $\overline{MSB}$. Upon falling of the count to 0, the output of the register 175 disables the AND gate at the A input of the adder 25 through the inverter 37 thereby prohibiting further subtraction. A signal "1" of the NOR gate 172 disables the AND gate 163 through the inverter 167 thereby resetting the register 165 at a timing of the signal B. The PLL flag thereupon falls.

In the above described manner, the PLL flag and the signals AE, DE and BE are respectively produced by the circuit shown in FIG. 11.

Figure 12:
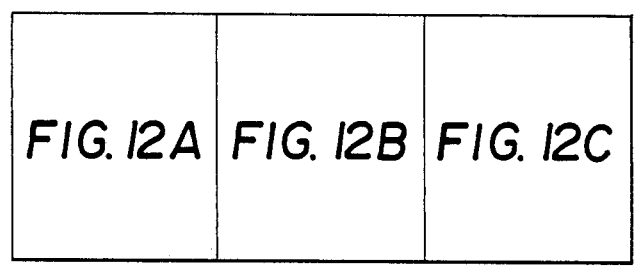
FIG. 12 which is split into

A specific example of the portion designated by reference character B in FIG. 5 which is controlled by the output of the control logic 48 is shown in FIG. 12. In FIG. 12, a 294 counter 43 is composed of a 9-bit half-adder. S outputs of respective stages 43-1 through 43-9 are applied to registers 211-219. The registers 211-219 are driven by clocks $\phi 1$ and $\phi 2$ prepared by the clock generator 40 by dividing one frame (136 $\mu s$) by 294 (i.e., 2.1609 MHz) and supply their outputs to A inputs of the respective stages 43-1 through 43-9. Carry outputs Co of the respective stages 43-1 through 43-9 are applied to carry inputs Ci of next stages and to a carry input Ci of the first stage 43-1 is constantly applied a signal VDD (="1"). Accordingly, the 294 counter 43 is constituted of a counter which counts at a speed of the clock $\phi 1$ and $\phi 2$, i.e., counting 294 counts from 0 to 293 in 136 $\mu s$ of one frame period. AND gates 201-209 receive a signal XFSYNC through an inverter 221 and the 294 counter 43 thereby is initially reset. The signal XFSYNC is a signal produced by an internal clock with a pulse width of 1/294 for each frame. Counts of the registers 211-219 are applied to a decoder 46 from which necessary timing signals are derived after decoding. The above described signals LSB, 3B and MSB are also produced on the basis of the output of the decoder 46. For controlling the circuit shown in FIG. 12, signals at count 293 and count 292 are also decoded. The 293 count signal is applied to the AND gates 201-209 through an OR gate 222 and an inverter 221 and is used for resetting the counter every 293 counts. Thus, the counter counting 294 counts of 0-293 for each frame is constituted. The 292 signal is used as a down signal for a frame remaining portion counter 52.

The frame remaining portion counter 52 consists of the upper counter 52A and the lower counter 52B. The lower counter 52B is composed of a 5-bit half-adder and S outputs of its respective stages 52B-1 through 52B-5 are applied to registers 241-245 through AND gates 231-235. To a carry input Ci of the first stage 52B-1 is applied the symbol synchronizing signal. The symbol synchronizing signal is a signal produced at each symbol data of 32 symbol data constituting one frame. One symbol data is composed of 14 data bits and 3 margin bits, totalling 17 bits. Accordingly, the symbol synchronizing signal can be produced by counting the reproduced clock reproduced from the EFM signal by 17. The lower counter 52B is counted up by 1 count by this symbol synchronizing signal. To the AND gates 231-235 which receive the outputs of the respective stages 52B-1 through 52B-5 is applied a signal derived by inverting an EFM frame signal by an inverter 201. The frame synchronizing signal is a signal produced once at each frame of the EFM signal upon detecting the synchronizing signal at the head of the frame. Upon generation of this frame synchronizing signal, the AND gates 231-235 are disabled so that the lower counter 52 is reset at each frame of the EFM signal.

The upper counter 52A is composed of a 4-bit fulladder and S outputs of its respective stages 52A-1 through 52A-4 are applied to registers 246-249 through AND gates 236-239. The outputs of the registers 246-249 are applied to B inputs of the respective stages and carry outputs of the respective stages are applied to carry inputs of next stages. The frame synchronizing signal is applied to the carry input Ci of the first stage 52A-1 of the upper counter 52A and the upper counter 52A is counted up by 1 count at each frame of the EFM signal. To A inputs of the respective stages is applied the 292 count signal from the decoder 46 and the upper counter 52A is counted down by 1 count every 136 $\mu s$ at which the 292 count signal is produced. When, accordingly, the actual linear velocity is the normal linear velocity, an up-pulse and a down-pulse are applied alternately to the upper counter 52A so that the upper counter 52A is stable at a certain count. When the actual linear velocity is larger than the normal linear velocity, the period of the up-pulse is shortened and therefore the count increases. When the actual linear velocity is smaller than the normal linear velocity, the period of the up-pulse is prolonged and the count decreases.

Upon reaching of the count of the upper counter 52A to 8, an AND gate 203 is disabled through an AND gate 223 and an inverter 224 and further counting up thereby is prohibited. Upon reaching of the count to 0, an AND gate 227 is disabled through an AND gate 225 and an inverter 226 and further counting down thereby is prohibited.

Upon setting of the PLL flag, the AND gates 236, 237 and 239 are disabled through an inverter 228 and the registers 246, 247 and 249 are thereby reset and the register 248 is set through an OR gate 238 whereby the initial setting is made.

A selection circuit 47 selectively outputs the output of the frame remaining portion counter 52 or the output of a simulation circuit 51 in response to the control mode signals PLL and SIM. The selection signals PLL and SIM are produced at a timing of the 293 count signal by AND gates 281 and 282. When the SIM mode has been selected, an AND gate 241 is enabled and a corresponding bit output of the simulation circuit 51 is produced through an OR gate 243. When the PLL mode has been selected, an AND gate 242 is enabled and a corresponding bit output of the frame remaining counter 52 is produced through an OR gate 243. The selection signal is produced at a timing of the 293 count signal prepared by the inside clock whereas the lower counter 52B of the frame remaining counter 52 is reset by the frame synchronizing signal which is not synchronous with the internal clock and counted by the symbol synchronizing signal. Accordingly, the count at a timing of the count $\overline{293}$ varies depending upon difference (i.e., phase difference) between the EFM signal and the internal clock and the magnitude of difference (phase difference) within one frame can thereby be detected.

A latch circuit 42 comprises registers 251-260 for latching respective bit signals, receives a signal selected by the selection circuit 47 and self-holds by a signal 293 derived by inverting the 293 count signal by an inverter 245. In the latch circuit 42, an AND gate 246 connected to registers 257, 258 and 259 has no functional significance, for Vss applied thereto is "0". When the OFF control mode has been selected in the control logic 48, a signal "1" is latched only in the register 259 through an AND gate 247. When the BRK control mode has been selected in the control logic 48, a signal "1" is latched only in the register 260 through an AND gate 128.

The register 251 of the least significant bit of the latch circuit 42 receives only the signal from the simulation circuit 51. This is because the number of output bits of the simulation circuit 51 is made larger by one bit than that of the frame remaining counter 52 for improving accuracy of control by the simulation circuit 51.

A coincidence detection circuit 44 detects coincidence between the output of the latch circuit 42 and the count of the 294 counter 43. The coincidence detection circuit 44 comprises exclusive OR gates EX1-EX9 to which the respective bit outputs of the latch circuit 42 and the respective bit outputs of the 294 counter 43. The outputs of the exclusive OR gates EX1-EX9 are applied to a NOR gate 261. When the count coincides with the output of the latch circuit 42, the NOR gate 261 produces a coincidence signal EQ (="1").

A PWM circuit 41 comprises a register 262 producing a drive pulse DM+ of a forward direction and a register 263 producing a drive pulse DM− of a reverse direction. The register 262 is set by enabling of an AND gate 264 and self-held by enabling of an $\overline{\text{AND gate 265}}$. The AND gate 264 receives three signals $\overline{\text{GE128}}$, EQ, $\overline{\text{GE256}}$. The signal $\overline{\text{GE128}}$ is derived by applying outputs of the registers 259 and 260 to an OR gate 272 and inverting them by an inverter 273 and represents that there is no "1" in either the register 259 or 260, i.e., the disc driving is not in the reverse direction. The signal EQ is a coincidence signal. The signal $\overline{\text{GE256}}$ is a signal derived by inverting the output of the register 219 corresponding to the 294 counter 43 by an inverter 271 and represents that the count has not reached 256 yet. Accordingly, when coincidence has been detected before the count has reached 256 in the forward driving, the AND gate 264 is enabled and the register 262 is set through the OR gate 264. The set state of the counter 262 is self-held until reaching of the count 256 by the signal $\overline{\text{GE256}}$ through an AND gate 256. Upon reaching of the count 256, the signal $\overline{\text{GE256}}$ is turned to "0", the AND gates 264 and 265 are disabled and the register 262 is reset. These operations are performed for each frame. By the foregoing operations, the register 262 produces a pulse-width modulated forward drive signal DM+ having a pulse width whose rising is determined by a value latched by the latch circuit 42 and whose falling is determined by the count 256 of the 294 counter and having a period of one frame (136 μs).

The register 263 is reset by enabling of the AND gate 267 and self-held by enabling of the AND gate 268. The AND gate 269 receives four signals GE128, $\overline{\text{EQ}}$, $\overline{\text{GE256}}$ and GE0. The signal GE128 represents disc driving in the reverse direction, the signal $\overline{\text{EQ}}$ is a signal derived by inverting the coincidence signal EQ by an inverter 274, the signal GE0 a signal derived by delaying the 293 count signal by a register 275 by one bit, i.e., a signal representing a timing at which the count of the 294 counter 43 is 0. Accordingly, the AND gate 267 is enabled when the count of the 294 counter 43 is 0 in the reverse driving thereby setting the register 263 through an OR gate 267. The set state of the register 263 is self-held through an AND gate 268. Upon generation of the coincidence signal EQ, the AND gates 267 and 268 are disabled and the register 263 is reset. By the foregoing operation, the register 262 produces a pulse-modulated reverse drive signal DM− having a pulse width whose rising is determined by resetting of the 294 counter 43 and whose falling is determined by generation of the coincidence signal EQ and having a period of one frame (136 μs).

Figure 13:
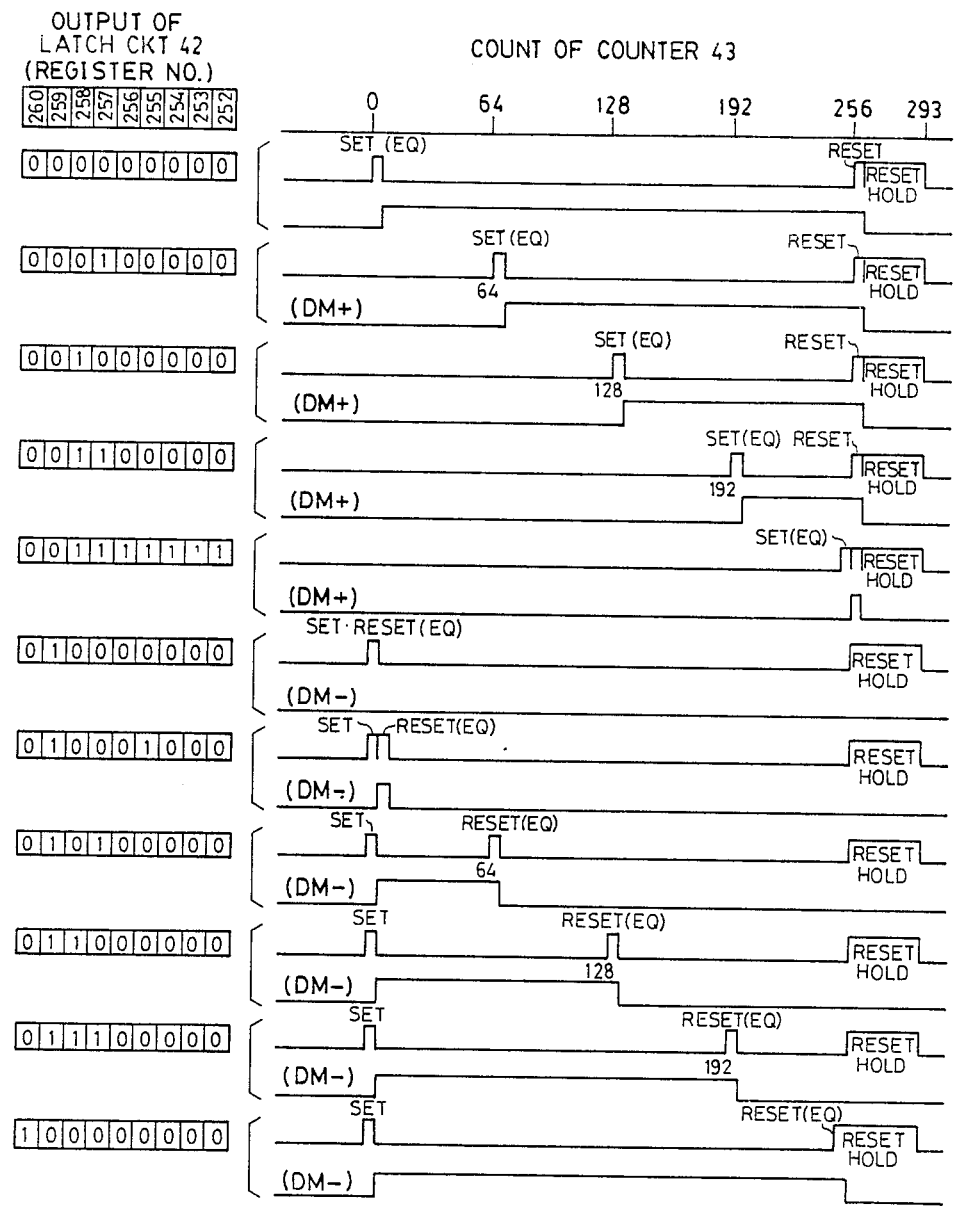
FIG. 13 is a diagram showing relationship between data latched by a latch circuit 42 of FIG. 12 and disc motor drive pulses DM.

In the above described manner, the forward drive signal DM+ rises at the coincidence and falls at the 256 count whereas the reverse drive signal DM− rises at the count 0 and falls at the coincidence. If, accordingly, the timing of coincidence changes, the pulse width of one drive signal is widened while that of the other drive signal is narrowed. If, for example, the timing of coincidence is quickened, the pulse width of the forward drive signal DM+ is widened whereas that of the reverse drive signal DM− is narrowed. Conversely, if the timing of coincidence is delayed, the pulse width of the forward drive signal DM+ is narrowed whereas that of the reverse drive signal DM− is widened. FIG. 13 shows change of the output pulse of the PWM circuit 41 relative to the respective outputs of the latch circuit 42.

The operation of the circuit shown in FIG. 12 in the respective control modes will now be described.

(a) PLL control mode

As was previously described with reference to FIG. 9, if, in one of the 4 to 7 modes, the rotation is in the range of MM (100 rpm–2000 rpm) the light beam is in focus and the PLL flag is up, the PLL mode signal is produced by the control logic 48 and data from the frame remaining counter 52 is selected by the selection circuit 47. Further, the higher 4-bit registers 249, 248, 247 and 246 of the frame remaining counter 52 are initially set to "0100" by the PLL flag. The control shifts to the lock control by the PLL flag. More specifically, if the actual linear velocity is larger than the normal linear velocity, the periods of the symbol synchronizing signal and the frame synchronizing signal are shortened resulting in increase in the count of the frame remaining portion counter 52 latched in the latch circuit 42. As a result, time required for detection of coincidence in the coincidence detection circuit 44 is prolonged, the pulse width of the drive signal DM+ is narrowed and the speed thereby changes in the increasing direction. If, conversely, the actual linear velocity is smaller than the normal linear velocity, the periods of the symbol synchronizing signal and the frame synchronizing signal are prolonged so that the count of the frame remaining portion counter 52 latched in the latch circuit 42 decreases. As a result, time required for detection of coincidence in the coincidence detection circuit 44 is shortened, the pulse width of the drive signal DM+ is widened and the speed changes in the increasing direction. Thus, the count of the frame remaining portion counter 52 latched in the latch circuit 42 is stabilized at a count at which the pulse width for the normal linear velocity is obtained. Since the rotation speed of the compact disc is within a range of 480 rpm (inner periphery) -210 rpm (outer periphery), the value of the latch circuit 42 is stabilized at about

| 0 | 0 | 1 | 1 | 1 | 0 | 0 | X | X | X |
|---|---|---|---|---|---|---|---|---|---| from MSB according to the relationship between the simulation output and the rotation speed shown in FIG. 9.

If, in the 2 mode or in one of the 4 to 7 modes, the rotation is within the range of MM, and the light beam is out of focus, the reproduced clock cannot be obtained and the PLL lock control cannot be performed. The control mode in this case shifts to the SIM control mode (FIG. 9). More specifically, the selection circuit 47 selects data from the simulation circuit 51 in response to the SIM mode signal from the control logic 48 and the selected data is latched in the latch circuit 42. The pulse width of the drive signal DM+ can be detected by this latched value. The value latched in the latch circuit 42 is fed directly back to the simulation circuit 51 so that the simulation value does not change and the rotation speed is maintained at a constant value.

(b) OFF control mode

Upon generation of the OFF control mode signal from the control logic 48, the register 259 of the latch circuit 42 is set by enabling of an AND gate 284 at a timing of the 293 count signal. Since no other control mode signal is produced at this time, the other registers 251–258 and 260 of the latch circuit 42 are not set.

Accordingly, the output of the register 259 is turned to "1" and the register 263 would be set at a timing of generation of the signal XFSYNC, i.e., at a timing of the count 0 of the 294 counter 43. Since, however, all inputs from the latch circuit 42 to the exclusive OR gates EX1–EX9 are turned to "0" and the coincidence signal EQ thereby is produced immediately, the register 263 after all is not set and neither of the drive signals DM+ and DM− is produced (i.e., DM+=0, DM−=0). No driving of the disc by the disc motor 3 therefore is performed but the disc is rotated simply by inertia.

(c) BRK control mode

If, in the 3½ mode, the rotation is within the range of MH or MM, the BRK control mode signal is produced by the control logic 48 and the register 260 of the latch circuit 42 is set at a timing of the 293 count signal. No other control mode signal is produced at this time so that the other registers 251–259 of the latch circuit 42 are not set. Accordingly, the output of the register 260 is turned to "1" and the register 263 is set at a timing of the signal XFSYNC so that the drive signal DM− is produced. Since the register 263 is reset only when the register 219 of the 294 counter 43 has been set and the coincidence signal EQ has been produced, the drive signal DM− maintains "1" during the entire counts of 0–256. The driving force in the reverse direction thereby is produced and the brake is applied to the disc motor 3.

(d) FO control mode

In the FO control mode, no control mode signal is produced by the control logic 48. The registers 251–260 of the latch circuit 42 therefore are all in a reset state and the coincidence detection signal EQ is produced at a timing of the count 0 of the 294 counter 43 thereby setting the register 262 and producing the drive signal DM+. The register 262 is reset when the count of the counter 43 has reached 256. The drive signal DM+ therefore is produced over the entire counts of 0–256 and the disc motor 3 is accelerated in the forward rotation.

What is claimed is:

1. A disc rotation control device for a disc player in which a disc motor rotates a disc and information is read from the rotating disc to generate a reproduced signal, the control device comprising:
   a stable rotation detection circuit for detecting whether disc rotation is in a stable state or in an unstable state;
   a phase control loop for controlling the disc rotation in accordance with a phase difference between the reproduced signal and an internal reference signal;
   direct control means for controlling the disc rotation wherein said direct control means includes (a) a pattern detection means for detecting a particular pattern in the reproduced signal and determining from said particular pattern whether the disc rotation speed is higher or lower than a predetermined speed, and (b) a circuit responsive to an output of said pattern detection means for selectively producing a pulse signal of a predetermined pulse width to control the disc motor; and
   means for switching the control of the disc rotation such that the disc rotation is controlled by said phase control loop when a table state of the disc rotation has been detected by said stable rotation detection circuit and by said direct control means when an unstable state of the disc rotation has been detected by said stable state detection circuit.

2. A disc rotation control device as defined in claim 1 further comprising:
   a hold circuit for holding data representing the phase difference between the reproduced signal and the internal reference signal;
   a detecting circuit for detecting presence or absence of the reproduced signal; and
   means for controlling the disc rotation using an output of said hold circuit instead of using the phase control loop or the direct control means when an absence of the reproduced signal has been detected by the detecting circuit.

3. A disc rotation control device as defined in claim 2 which further comprises a latch circuit for latching an output of said hold circuit, and wherein said hold circuit holds as said phase difference data a value obtained by integrating an output of said latch circuit.

4. A disc rotation control device as defined in claim 1 wherein said phase control loop comprises:
   a circuit for producing speed command data for the disc motor;
   a counter circulating at a predetermined rate;
   a comparison circuit for comparing the speed command data with a count of said counter; and
   a circuit for producing a disc motor drive pulse signal of a pulse width corresponding to an output of said comparison circuit to control the disc motor.

5. A disc rotation control device as defined in claim 1 wherein said pattern detection means comprises:
   a change detection circuit for detecting change in the rise and fall of the reproduced signal;
   cascaded registers receiving an output of said change detection circuit and being shifted by a predetermined clock signal;
   gate circuits provided repsectively at inputs of said registers except for a first stage thereof;
   means for turning off said gate circuits when change in the reproduced signal has been detected by said change detection circuit; and
   means for detecting a specific signal pattern of the reproduced signal by taking a logical product of an output of a last stage of said registers and an output of said change detection circuit thereby to indicate whether the rotation is higher or lower than a predetermined speed.

6. A disc rotation control device as defined in claim 1 wherein the reproduced signal is dividing into frames and wherein said stable rotation detection circuit includes means for producing a synchronizing signal indicating that there is no substantial change in the time width of a frame in the reproduced signal, counter means for counting said synchronizing signal, and means for determining that the disc rotation is in the stable state if the count has reached a predetermined count.

7. A disc rotation control device as defined in claim 6 wherein said means for producing a synchronizing signal comprises:
 a circuit for reproducing a frame synchronizing signal from the reproduced signal;
 a circuit for reproducing a clock signal from the reproduced signal;
 a circuit for frequency-dividing said reproduced clock signal; and
 a circuit for producing a logical product of the reproduced frame synchronizing signal and the frequency-divided clock signal to obtain said synchronizing signal to be counted.

8. A disc rotation control device as defined in claim 7 wherein said counter means counts up at a predetermined rate when said synchronizing signal to be counted is present, wherein the stable rotation detection circuit further includes means for causing said phase control loop to operate when the count has reached a predetermined count, means for causing the counter means to count down at a predetermined rate when said signal to be counted is absent and means for causing said direct control means to operate when the count has reached another predetermined count.

9. A disc control device as defined in claim 8 wherein the rate of counting up in said counter means is greater than the rate of counting down.

10. A disc rotation control device as defined in claim 1 wherein said phase control loop comprises:
 a counter counting the internal reference signal;
 an up-down counter being up-down controlled by an output of said counter and a frame synchronizing signal produced in accordance with the reproduced signal;
 a latch circuit for latching an output of said up-down counter;
 a comparison circuit for comparing an output of said latch circuit and an output of said counter; and
 a circuit for producing a signal which is pulse-width-modulated in response to an output of said comparison cirucit.

* * * * *